US009247846B2

(12) United States Patent
Glucksman et al.

(10) Patent No.: US 9,247,846 B2
(45) Date of Patent: **\*Feb. 2, 2016**

(54) HOT BEVERAGE BREWING APPARATUS

(75) Inventors: Dov Z. Glucksman, Danvers, MA (US);
Gary P. McGonagle, Lynn, MA (US);
Laura J. Nickerson, Fitchburg, MA (US)

(73) Assignee: SolaBev LLC, Denver, CO (US)

(\*) Notice: Subject to any disclaimer, the term of this patent is extended or adjusted under 35 U.S.C. 154(b) by 866 days.

This patent is subject to a terminal disclaimer.

(21) Appl. No.: 13/460,931

(22) Filed: May 1, 2012

(65) Prior Publication Data

US 2012/0210876 A1    Aug. 23, 2012

Related U.S. Application Data

(63) Continuation of application No. 11/772,416, filed on Jul. 2, 2007, now Pat. No. 8,180,204.

(51) Int. Cl.
*F22B 1/30*  (2006.01)
*H05B 3/30*  (2006.01)
*A47J 31/44* (2006.01)
*A47J 31/057* (2006.01)

(52) U.S. Cl.
CPC ............ *A47J 31/4407* (2013.01); *A47J 31/057* (2013.01)

(58) Field of Classification Search
CPC ..... A47J 31/407; A47J 31/3633; A47J 31/46; A47J 31/4403; A47J 31/3628; A47J 31/3695; A47J 31/44; A47J 31/30; A47J 31/00; A47J 31/4407; A47J 31/057; B65D 85/8046

USPC ......... 392/294, 308, 324, 328, 341, 441, 471, 392/499; 219/200, 287, 432; 99/281, 99/292–295, 301, 302 R, 410, 417
See application file for complete search history.

(56) References Cited

U.S. PATENT DOCUMENTS

| | | | | |
|---|---|---|---|---|
| 2,072,199 A | * | 3/1937 | De Ayala | 99/294 |
| 2,343,017 A | * | 2/1944 | Mattoon | 99/322 |
| 2,365,269 A | * | 12/1944 | Hill, Jr. | 99/305 |
| 2,450,061 A | * | 9/1948 | Smith | 392/328 |
| 2,544,836 A | * | 3/1951 | Hotvedt | 99/282 |
| 2,692,703 A | * | 10/1954 | Bramming | 222/67 |
| 3,024,718 A | * | 3/1962 | Morrison | 99/282 |
| 3,053,166 A | * | 9/1962 | Ashley | 99/473 |
| 3,443,508 A | * | 5/1969 | Reynolds et al. | 99/282 |
| 3,444,803 A | * | 5/1969 | Karlen | 99/285 |
| 3,450,024 A | * | 6/1969 | Martin | 99/295 |
| 3,568,887 A | * | 3/1971 | Jacobs et al. | 222/640 |
| 3,596,675 A | * | 8/1971 | Krueger et al. | 137/389 |

(Continued)

FOREIGN PATENT DOCUMENTS

WO    WO 2005/041729 A2    5/2005

*Primary Examiner* — Eric Stapleton

(57) ABSTRACT

A hot beverage brewing apparatus. A pressurized hot liquid delivery system provides liquid under pressure within a range of acceptable brewing temperatures without any mechanical pump. Water is apportioned into sealable tank volumes, one of which is heated to boil the liquid and produce steam under pressure. The pressurized steam displaces the liquid from the tank volumes in proportion and at a temperature that is within the acceptable brewing range. The hot liquid under pressure is directed to a capsule receiving station to infuse a material in a capsule. The capsule dispenses the brewed beverage without contacting the brewing apparatus.

8 Claims, 17 Drawing Sheets

(56) References Cited

U.S. PATENT DOCUMENTS

| | | | | |
|---|---|---|---|---|
| 3,790,029 A * | 2/1974 | Ward | | 222/129.4 |
| 3,804,635 A * | 4/1974 | Weber | | 99/283 |
| 3,844,206 A * | 10/1974 | Weber | | 99/282 |
| 3,844,450 A * | 10/1974 | Johnson | | 222/183 |
| 3,853,043 A * | 12/1974 | Stavropoulos | | 99/306 |
| 3,878,360 A * | 4/1975 | Augustine et al. | | 392/444 |
| 3,918,355 A * | 11/1975 | Weber | | 99/283 |
| 3,958,502 A * | 5/1976 | Vitous | | 99/300 |
| 3,987,715 A * | 10/1976 | Muller | | 99/275 |
| 4,007,856 A * | 2/1977 | Murphy et al. | | 222/67 |
| 4,147,097 A * | 4/1979 | Gregg | | 99/283 |
| 4,167,136 A * | 9/1979 | Chupurdy | | 99/306 |
| 4,287,817 A * | 9/1981 | Moskowitz et al. | | 99/282 |
| 4,353,293 A * | 10/1982 | Illy | | 99/283 |
| 4,389,169 A * | 6/1983 | De Dionigi | | 417/417 |
| 4,389,925 A * | 6/1983 | Piana | | 99/289 R |
| 4,464,981 A * | 8/1984 | Stover | | 99/282 |
| 4,470,999 A * | 9/1984 | Carpiac | | 426/506 |
| 4,516,484 A * | 5/1985 | De Ponti | | 99/279 |
| 4,782,744 A * | 11/1988 | Bunn | | 99/307 |
| 4,790,239 A * | 12/1988 | Hewitt | | 99/279 |
| 4,791,860 A * | 12/1988 | Verheijen | | 99/323.3 |
| 4,792,059 A * | 12/1988 | Kerner et al. | | 222/67 |
| 4,908,222 A * | 3/1990 | Yu | | 426/241 |
| 4,920,871 A * | 5/1990 | Anson et al. | | 99/295 |
| 4,921,712 A * | 5/1990 | Malmquist | | 464/77 |
| 4,978,833 A * | 12/1990 | Knepler | | 392/449 |
| 5,025,714 A * | 6/1991 | Brewer | | 99/300 |
| 5,042,689 A * | 8/1991 | Mrugala et al. | | 222/66 |
| 5,063,838 A * | 11/1991 | Matuschek | | 99/307 |
| 5,142,966 A * | 9/1992 | Morandi et al. | | 99/352 |
| 5,154,110 A * | 10/1992 | Chang | | 99/281 |
| 5,191,829 A * | 3/1993 | Caffarella | | 99/352 |
| 5,195,422 A * | 3/1993 | Newnan | | 99/283 |
| 5,265,517 A * | 11/1993 | Gilbert | | 99/280 |
| 5,357,848 A * | 10/1994 | Eugster et al. | | 99/279 |
| 5,375,508 A * | 12/1994 | Knepler et al. | | 99/280 |
| 5,392,694 A * | 2/1995 | Muller et al. | | 99/295 |
| 5,417,145 A * | 5/1995 | Joseph et al. | | 99/280 |
| 5,498,757 A * | 3/1996 | Johnson et al. | | 426/520 |
| 5,584,229 A * | 12/1996 | Anson | | 99/280 |
| 5,584,299 A * | 12/1996 | Sakai et al. | | 600/494 |
| 5,586,487 A * | 12/1996 | Marino | | 99/330 |
| 5,678,472 A * | 10/1997 | Millman | | 99/279 |
| 5,724,883 A * | 3/1998 | Usherovich | | 99/290 |
| 5,855,161 A * | 1/1999 | Cortese | | 99/289 P |
| 5,858,437 A * | 1/1999 | Anson | | 426/431 |
| 5,902,620 A * | 5/1999 | Nolan | | 426/241 |
| 5,913,961 A * | 6/1999 | Chmiel et al. | | 99/286 |
| 6,009,792 A * | 1/2000 | Kraan | | 99/295 |
| 6,019,028 A * | 2/2000 | Schmed | | 99/293 |
| 6,065,609 A * | 5/2000 | Lake | | 210/474 |
| 6,213,199 B1 | 4/2001 | Al-Khateeb | | 165/258 |
| 6,224,755 B1* | 5/2001 | Schamberg et al. | | 210/149 |
| 6,229,128 B1* | 5/2001 | Policappelli | | 219/689 |
| 6,405,637 B1* | 6/2002 | Cai | | 99/293 |
| 6,460,735 B1* | 10/2002 | Greenwald et al. | | 222/146.1 |
| 6,499,388 B2* | 12/2002 | Schmed | | 99/295 |
| 6,510,783 B1* | 1/2003 | Basile et al. | | 99/289 R |
| 6,520,070 B1* | 2/2003 | Heczko | | 99/323.3 |
| 6,557,584 B1* | 5/2003 | Lucas et al. | | 137/613 |
| 6,606,938 B2* | 8/2003 | Taylor | | 99/295 |
| 6,612,224 B2* | 9/2003 | Mercier et al. | | 99/282 |
| 6,655,261 B1* | 12/2003 | Horstmann | | 99/319 |
| 6,681,960 B2* | 1/2004 | Garman | | 222/189.11 |
| 6,786,134 B2* | 9/2004 | Green | | 99/289 P |
| 6,793,099 B1* | 9/2004 | Sleiman | | 222/67 |
| 6,904,840 B1* | 6/2005 | Pfeifer et al. | | 99/295 |
| 6,962,104 B1* | 11/2005 | Podlucky et al. | | 99/300 |
| 7,093,533 B2* | 8/2006 | Tebo et al. | | 99/315 |
| 7,097,074 B2* | 8/2006 | Halliday et al. | | 222/85 |
| 7,234,389 B1* | 6/2007 | Lassota | | 99/282 |
| 7,279,190 B1* | 10/2007 | Lassota et al. | | 426/433 |
| 7,401,613 B2* | 7/2008 | Carhuff et al. | | 134/22.18 |
| 7,552,673 B2* | 6/2009 | Levin | | 99/323.3 |
| 7,594,525 B2* | 9/2009 | Girard et al. | | 141/362 |
| 7,624,896 B2* | 12/2009 | Doglioni Majer | | 222/146.2 |
| 7,703,383 B2* | 4/2010 | Knitel | | 99/302 R |
| 8,584,665 B2* | 11/2013 | Stippler et al. | | 126/640 |
| 2002/0051632 A1* | 5/2002 | Kodden et al. | | 392/471 |
| 2002/0074350 A1* | 6/2002 | Jones et al. | | 222/146.5 |
| 2002/0078831 A1* | 6/2002 | Cai | | 99/295 |
| 2002/0121197 A1* | 9/2002 | Mercier et al. | | 99/279 |
| 2002/0129712 A1* | 9/2002 | Westbrook et al. | | 99/279 |
| 2002/0130137 A1* | 9/2002 | Greenwald et al. | | 222/54 |
| 2002/0141742 A1* | 10/2002 | Beaulieu | | 392/471 |
| 2002/0144604 A1* | 10/2002 | Winkler et al. | | 99/302 R |
| 2002/0145008 A1* | 10/2002 | Jones et al. | | 222/146.5 |
| 2002/0148357 A1* | 10/2002 | Lazaris et al. | | 99/295 |
| 2002/0178932 A1* | 12/2002 | Cai | | 99/516 |
| 2003/0003208 A1* | 1/2003 | Lassota | | 426/433 |
| 2003/0005826 A1* | 1/2003 | Sargent et al. | | 99/279 |
| 2003/0024948 A1* | 2/2003 | Last | | 222/103 |
| 2003/0096038 A1* | 5/2003 | Cai | | 426/77 |
| 2003/0155101 A1* | 8/2003 | Minney | | 165/58 |
| 2003/0196554 A1* | 10/2003 | Koontz et al. | | 99/323.3 |
| 2004/0005384 A1* | 1/2004 | Cai | | 426/77 |
| 2004/0031393 A1* | 2/2004 | de Bruin et al. | | 99/279 |
| 2004/0094472 A1* | 5/2004 | Brouwer | | 210/469 |
| 2004/0112224 A1* | 6/2004 | Drobeck | | 99/279 |
| 2004/0194629 A1* | 10/2004 | Jones et al. | | 99/279 |
| 2004/0194631 A1* | 10/2004 | Pope | | 99/279 |
| 2004/0197444 A1* | 10/2004 | Halliday et al. | | 426/112 |
| 2004/0228955 A1* | 11/2004 | Denisart et al. | | 426/590 |
| 2005/0003052 A1* | 1/2005 | Brouwer | | 426/275 |
| 2005/0011364 A1* | 1/2005 | Chen et al. | | 99/275 |
| 2005/0034604 A1* | 2/2005 | Halliday et al. | | 99/279 |
| 2005/0150391 A1* | 7/2005 | Schifferle | | 99/295 |
| 2005/0166763 A1* | 8/2005 | Scarchilli et al. | | 99/279 |
| 2005/0204925 A1* | 9/2005 | Orrico et al. | | 99/275 |
| 2005/0211102 A1* | 9/2005 | Vu et al. | | 99/279 |
| 2005/0247205 A1* | 11/2005 | Chen et al. | | 99/279 |
| 2006/0005712 A1* | 1/2006 | Greenwald et al. | | 99/275 |
| 2006/0019000 A1* | 1/2006 | Zanetti | | 426/112 |
| 2006/0065127 A1* | 3/2006 | Dalton et al. | | 99/279 |
| 2006/0090653 A1* | 5/2006 | McDuffie et al. | | 99/279 |
| 2006/0107841 A1* | 5/2006 | Schifferle | | 99/279 |
| 2006/0191913 A1* | 8/2006 | Park | | 219/679 |
| 2006/0249035 A1* | 11/2006 | Lin | | 99/495 |
| 2006/0280841 A1* | 12/2006 | Cai | | 426/77 |
| 2007/0034086 A1* | 2/2007 | Colman et al. | | 99/279 |
| 2007/0051246 A1* | 3/2007 | Suzuki | | 99/275 |
| 2007/0062377 A1* | 3/2007 | Stieger et al. | | 99/279 |
| 2009/0007792 A1* | 1/2009 | Glucksman et al. | | 99/282 |
| 2009/0007793 A1* | 1/2009 | Glucksman et al. | | 99/287 |

* cited by examiner

HOT BEVERAGE BREWING APPARATUS

CROSS REFERENCES TO RELATED APPLICATIONS

This is a continuation of co-pending U.S. patent application Ser. No. 11/772,416 filed Jul. 2, 2007 for a Hot Beverage Brewing Apparatus assigned to the same assignee as the present invention.

U.S. patent application Ser. No. 11/772,388 filed Jul. 2, 2007 for an Infusible Material Capsule for Brewing a Beverage assigned to the same assignee as the present invention and incorporated by reference herein.

BACKGROUND OF THE INVENTION

1. Field of the Invention

This invention generally relates to the brewing of beverages. More specifically this invention relates to apparatus for brewing a hot beverage by infusing an infusible material, such as ground coffee, with pressurized liquid, such as water, at an acceptable brewing temperature.

2. Description of Related Art

For many years preparing a beverage, such as coffee, has involved brewing multiple servings in a pot or other container using loose coffee grounds. In some apparatus, the coffee grounds mix with hot water and are then removed from the brewed beverage as, for example, in the so-called "French press" coffee maker. Other apparatus uses a drip brewing procedure that directs hot liquid at low pressure through an open or closed basket containing the loosely ground coffee over a filter, such as a paper filter cone.

The procedures and apparatus for brewing beverages, particularly coffee, have undergone many transformations in recent years spurred by different market requirements. A convenience requirement led to prepackaged packets of ground coffee as a substitute for manually measuring coffee from bulk packages of loose, ground coffee, as in conventional drip coffee makers. A prepackaged packet comprises a permeable filter paper pouch with a pre-measured portion of loose ground coffee. An impervious package stores the packet to maintain freshness. A packet is removed from its package and placed in a basket or like receptacle. Then hot water at atmospheric pressure flows through the packet and its contents for extracting flavor and aroma from the ground coffee.

The foregoing apparatus typically brews multiple beverage servings. Now many users prefer to brew individual servings. This preference for single-serve brewing apparatus, especially for home use, led to the development of pre-packaged disposable capsules, or cartridges, with prepackaged infusible material, and related brewing apparatus. For example, U.S. Pat. No. 4,921,712 (1990) to Malmquist discloses a disposable cartridge for use in an automatic drip-type beverage brewing machine. The cartridge contains a filter member with ground coffee. A closed end of the cartridge has a plurality of holes and forms a shallow receptacle. A user removes a sealing foil from the receptacle and places the cartridge on ledges in a brewing apparatus spaced from a water delivery spout and over the receptacle. The apparatus delivers hot water at atmospheric pressure and at a controlled rate onto the top of the cartridge. Brewed beverage emerges from the bottom of the cartridge for accumulation in the receptacle. There is no requirement for sealing between the apparatus and the cartridge so long as water does not overflow the shallow receptacle.

U.S. Pat. No. 6,612,224 (2003) to Mercier et al. discloses an apparatus for brewing a beverage in which water is fed by gravity from two heated tanks. The temperature of the water in each tank can be adjusted to an optimum value for a different type of brewing. U.S. Pat. No. 6,681,960 (2004) to Garman discloses another low-pressure beverage preparation system in which a brewing chamber receives a cartridge.

Minimizing the brewing time has become another market requirement. It was determined early on that the extraction time or "brewing cycle" of such brewing apparatus could be shortened significantly if the infusible material, such as coffee beans, were ground more finely than those used in such drip-type brewing apparatus. Finer grinding exposes a larger surface area to the water. However, the coffee grounds have a higher packing fraction and volumetric density. This increases hydraulic resistance to the flow of water through the cartridge and the grounds therein. It was found that low pressure apparatus was not efficient for brewing beverages using dense or compacted infusible material.

Rather, water had to be delivered in a closed brewing chamber under an elevated pressure to be able to flow through the coffee in a short period of time. This led to a development of sealed brewing chambers formed by members that are integral to the brewing apparatus. For example, U.S. Pat. No. 4,389,925 (1983) to Paina discloses a beverage extracting and dispensing machine for use with flattened round cartridges. A cartridge contains an infusible product, such as ground coffee, and has permeable upper and lower walls traversing a substantially cylindrical side wall. In this reference a pressure plate coacts with the cartridge to provide sealing.

A myriad of other approaches have been attempted to provide a hot liquid at an elevated pressure for brewing through a cartridge or capsule. For example, U.S. Pat. No. 6,606,938 (2003) to Taylor discloses an apparatus that uses a disposable cartridge that is initially pierced and vented by a tubular outlet probe and then pierced by a tubular inlet probe. Heated liquid is directed into the cartridge through the inlet probe for combination with the beverage medium to produce the beverage. The outlet probe provides a means for extracting the beverage from the cartridge. This apparatus utilizes an air pump and sealed chamber for metering the amount of heated water to be expelled and fed to the cartridge.

U.S. Pat. No. 6,786,134 (2004) to Green discloses a coffee and tea dispenser that infuses material in a cartridge. An injection system, including a water heater and a pump, provides the water under pressure at an elevated temperature.

Similarly, U.S. Pat. No. 7,097,074 (2006) to Halliday discloses a beverage brewing apparatus which includes a cartridge holder held for infusion in the apparatus by a hot liquid under pressure. A water pump and a heater combine to provide hot water at an elevated temperature.

U.S. Patent Application Publication No. US2005/0150391 (2005) to Schifferle discloses a coffee maker in which the coffee is contained in a cartridge. Again, a pump and hot water heater provide water at a brewing temperature to be directed into a brewing chamber including the cartridge.

Any pump configurations for use in brewing apparatus should be able to provide liquid to a brewing chamber at a gauge pressure of about 1 bar (i.e., 1 barg) and at a flow rate in the range of 100 to 400 ml per minute. Reciprocating electromagnetic pumps can satisfy these requirements and are popular for pumping in many beverage brewing apparatuses. U.S. Pat. No. 4,389,169 (1983) to De Dionghi discloses on embodiment that includes a reciprocating piston, a field coil for driving the piston in one direction, a spring for driving the piston in the other direction and suction and delivery valves. As will be apparent and as known, such pumps must be manufactured to close tolerances. Consequently they are expensive components to use in hot beverage brewing apparatus.

The foregoing and other drawbacks have led to the development of brewing apparatus that incorporates a sealed water boiler that heats water above its boiling point. This produces sufficient pressure to drive the liquid from the boiler through the infusible material at an increased pressure. However, at a pressure of 1 barg the boiling point of water increases from 100° C. (the boiling temperature for water at sea level and at standard barometric pressure) to about 120° C. This is well above the acknowledged acceptable brewing temperature range of 90° C. to 96° C. for coffee. As known, brewing a beverage above an acceptable range of brewing temperatures adversely impacts the quality of the brewed beverage. For example, brewed coffee can have a bitter taste and lack any aroma.

U.S. Pat. No. 3,844,206 (1974) to Weber discloses a beverage brewing apparatus with a heating chamber that receives the incoming water. A cover closes the chamber and has pressure regulating and pressure relief valves. The bottom of the heating chamber includes two electric heaters. When the water temperature reaches a proper brewing temperature, the chamber is under a vapor pressure. One of the two heaters is de-energized. Then a valve opens. Water discharges into the infusion chamber under the vapor pressure developed during heating. The infusible material, which is in a cartridge, is also subject to slight increase in pressure so water absorbed in the infusion material is driven from the chamber and into a receptacle.

In the infusion apparatus of U.S. Pat. No. 3,918,355 (1975) to Weber a first chamber contains a liquid, such as water, heated to a predetermined temperature. A second chamber contains the infusion material and is in fluid communication with the first chamber. When the temperature reaches a predetermined value, a latch releases a weight that descends through the first chamber trapping air beneath it. This weight forces hot liquid, under substantially constant pressure, from the first chamber through the passage into the second chamber. Trapped air is then forced through the material to remove any remaining excess liquid.

U.S. Pat. No. 4,147,097 (1979) to Gregg discloses a drip-type coffee maker in which cold water is fed from a reservoir to two heating chambers. One heating chamber is maintained at a temperature that is optimized for interaction with an infusible material. The other chamber maintains water at a higher temperature. The first chamber provides water to the infusible material. The infused liquid discharges into a pot or other receptacle. The second chamber discharges directly into the pot whereby the hot water from the second chamber mixes with the brewed beverage from the brewing chamber to achieve an appropriate drinking temperature.

U.S. Pat. No. 4,287,817 (1981) to Moskowitz et al. discloses another approach in which a conventional heater heats water in a container. The hot water exits from a bottom outlet of the container through valves. Steam can also be produced. Specifically, water in the container is heated to a boiling point that results in the accumulation of steam in the container so the water within the container is forced through an outlet to brew the beverage in an infuser.

Using such brewing apparatus in non-residential environments, such as in hotels or other commercial establishments, imposes still other market requirements. In a hotel environment, for example, in-room coffee apparatus must be compact, inexpensive, reliable and easy to use and must operate with minimal costs. Such brewing apparatus must minimize the efforts of room attendants to clean and maintain the brewing apparatus, to dispose of used coffee grounds and to replenish coffee supplies in the room. In many hotels today in-room coffee apparatus includes a water heater, cups and prepackaged, pre-measured sealed packets of instant coffee. Other hotels have begun to use conventional coffee brewing machines that use capsules or cartridges to brew the coffee.

Notwithstanding the various proposals including those described in the foregoing art, commercially available units for brewing a hot beverage by infusing a material, such as compacted ground coffee, with a hot liquid, such as water, under pressure continue to incorporate both a heater and a pressure pump with the additional costs imposed by the pump and attendant electric and fluid connections and more complex control systems. Such apparatus also tends to be large and bulky. The noise generated by the pump is another deterrent to its use. What is needed is an apparatus for brewing a hot beverage by infusing a material with a hot liquid under pressure at a brewing temperature within the acceptable temperature range, that eliminates the need for a mechanical pump, that reduces manufacturing costs, that maximizes reliability, that is compact and easy for an individual to use and that minimizes the need for regular cleaning and other maintenance.

SUMMARY

Therefore it is an object of this invention to provide an apparatus for brewing a hot beverage by infusing a material with a hot liquid under pressure that meets all the above-identified market requirements.

Another object of this invention is to provide an apparatus for brewing a hot beverage by infusing a material with a hot liquid under pressure at a brewing temperature within an acceptable brewing temperature range.

Still another object of this invention is to provide an apparatus for brewing a hot beverage by infusing a material with a hot liquid under pressure that eliminates any mechanical pump.

Yet another object of this invention is to provide an apparatus for brewing a hot beverage by infusing a material with a hot liquid under pressure that operates with simplified controls.

Yet still another object of this invention is to provide an apparatus for brewing a hot beverage by infusing a material with a hot liquid under pressure that is compact, reliable and inexpensive to manufacture.

Still yet another object of this invention is to provide an apparatus for brewing a hot beverage by infusing a material with a hot liquid under pressure that minimizes the need for regular cleaning and other maintenance.

In accordance with one aspect of this invention a pressurized hot liquid delivery system delivers pressurized hot liquid at an acceptable temperature to a utilization device. The system comprises first and second tanks that define first and second tank volumes. Liquid is poured through a sealable liquid inlet to accumulate in the first and second tanks. The first and second tanks connect to a common chamber. A liquid mixer connects to the utilization device. A port network interconnects the first and second tanks and the liquid mixer. A heater in the first tank boils the liquid therein. When the liquid inlet is sealed, liquid vapor is generated under pressure in the common chamber thereby to force liquid from the first and second tanks through the liquid mixer to the utilization device at the acceptable temperature and under pressure.

In accordance with another aspect of this invention there is provided apparatus for brewing a hot beverage by infusing a material with a hot liquid under pressure at an acceptable brewing temperature. The apparatus comprises a tank, a heater, a water mixer and a brewing chamber. The tank forms first and second tank volumes and includes a sealable inlet for directing liquid at an input temperature into the tank and an outlet for passing liquid from the tank. The heater boils the liquid in the first tank volume when the inlet is sealed to produce steam under a pressure while the liquid in the second tank volume remains substantially at the input temperature. The steam pressure is applied substantially equally to the liquid in each of the first and second tank volumes causing liquid from the tank volumes to flow through the outlet. The water mixer mixes the liquid flowing from the outlet to provide pressurized hot liquid substantially at the acceptable brewing temperature. The brewing chamber brews the beverage with the pressurized hot liquid from the mixer by directing the pressurized hot liquid through the material contained in the brewing chamber to be dispensed at an outlet thereof as the brewed beverage.

In accordance with still another aspect of this invention there is provided apparatus for dispensing a hot beverage into a beverage receptacle after infusing a material in a capsule having a cover and a sealed outlet. A housing defines a plurality of stations for performing different functions. A lid hinged from the housing moves between opened and closed positions. A platform station supports the beverage receptacle. The apparatus includes a pressurized hot water dispensing station that produces water at an appropriate brewing temperature. A capsule receiving station holds the capsule during brewing and includes a well that circumscribes the capsule, first and second supports and an infuser. The first support engages the sealed outlet after the capsule is inserted into the well when the lid is open and for rupturing the sealed outlet when the lid closes. The second support engages the capsule in the well when the lid is closed. The infuser attaches to the lid and connects to the dispensing station for infusing the material contained the capsule whereby the apparatus dispenses the hot beverage into a receptacle at the platform station.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
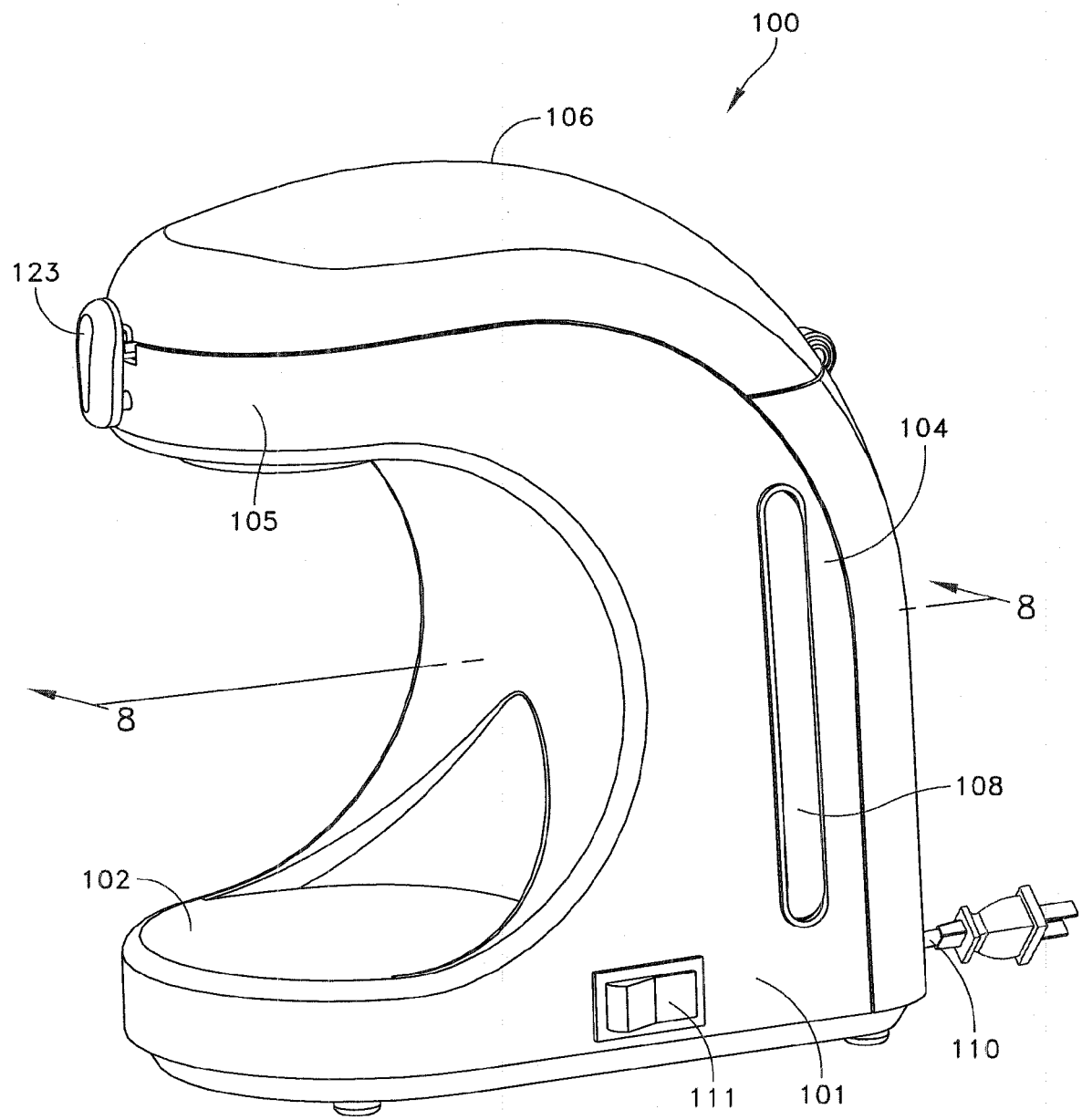
FIG. 1 is a perspective view of one embodiment of a beverage brewing apparatus constructed in accordance with this invention.

The specifically disclosed embodiment of a hot beverage brewing system includes a capsule and portions of a brewing apparatus that are also described in greater detail in co-pending U.S. patent application Ser. No. 11/772,388. This description uses the same reference numerals to identify the same elements as appear in that co-pending application. The constructions of both are somewhat interdependent; that is, a modification to the capsule could require a corresponding modification to the brewing apparatus. Consequently the following description initially discloses the construction and operation of the hot beverage brewing system from the user's perspective. Next the description reviews (1) the important construction and operation features of the capsule and (2) a capsule receiving station, both of which are disclosed in greater detail in the co-pending application. Then the description discusses the construction and operation of a pressurized hot water delivery system that is particularly adapted for implementing this invention.

The Hot Beverage Brewing System

Figure 2:
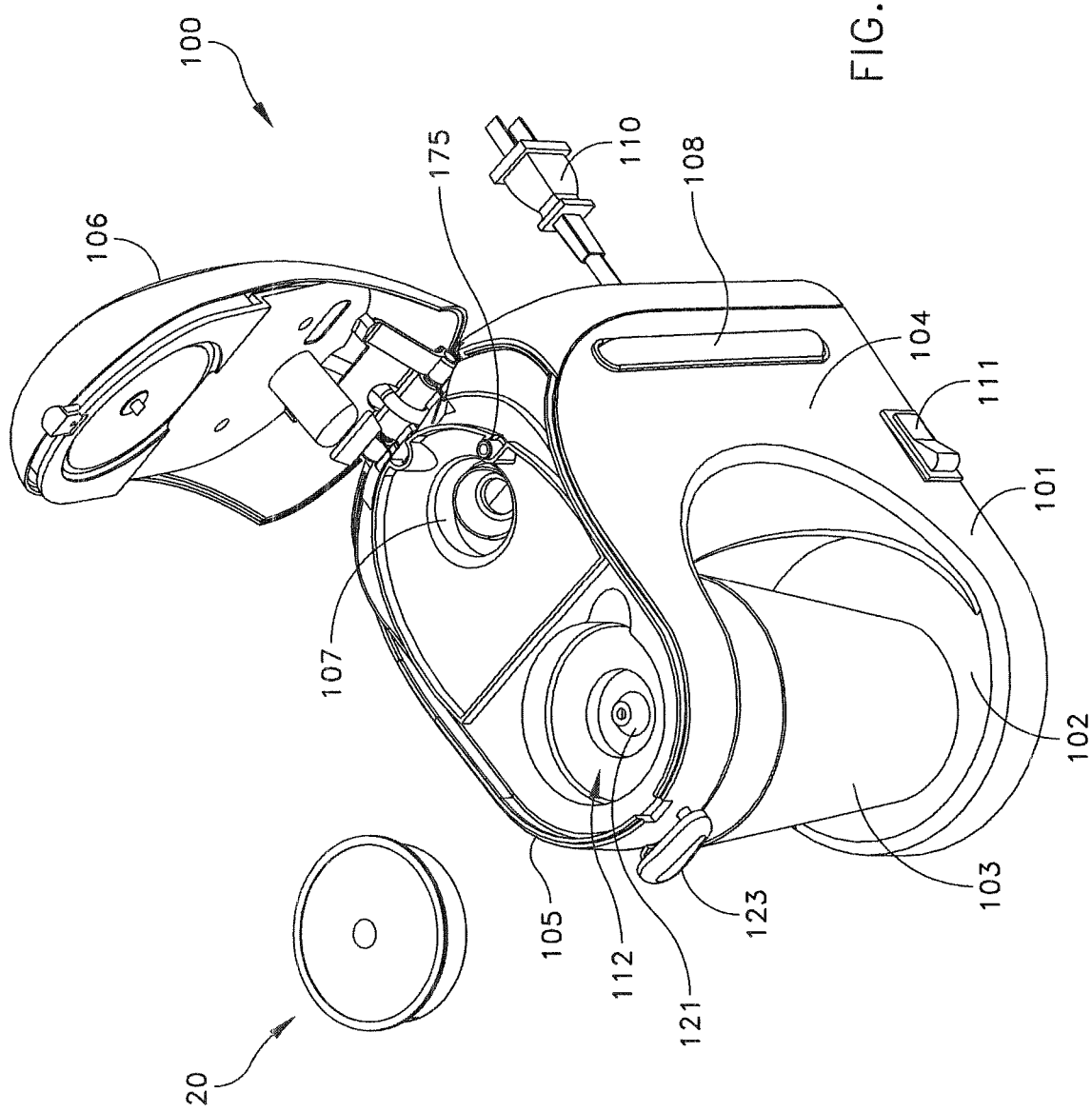
FIG. 2 is a perspective view of the beverage brewing apparatus of FIG. 1 with its lid opened.

FIGS. 1 and 2 are two different views of a hot beverage brewing apparatus 100 that infuses a material with a hot liquid supplied at a brewing temperature within an acceptable temperature range and under pressure. For purposes of this description, the depicted apparatus brews coffee by infusing packed ground coffee in a capsule 20 (FIG. 2) with water at an acceptable brewing temperature in the range from 90° C. to 96° C. and at a pressure of about 1 bar to provide optimum brewing quality and brewing time.

From the user's perspective the apparatus in FIGS. 1 and 2 has a base housing 101 with a platform station 102 for receiving a mug, cup or other type of beverage receptacle 103 (FIG. 2). A vertical housing 104 rises from the base structure 101 and supports an upper housing 105 that cantilevers over the platform station 102. The vertical housing 104 carries a hinged lid 106 and houses a pressurized hot water delivery system.

With particular reference to FIG. 2, the user pours a required quantity of water into a water filling station 107 that is exposed when the lid 106 is open. Typically the user will fill the receptacle 103 with cold water and then pour the cold water into the water filling station 107. A water level indicator 108 allows the user to determine the quantity of water in the apparatus. The apparatus 100 also includes a power cord 110 and a switch 111 to start a self-terminating brewing cycle. As shown in FIG. 2 the upper housing 105 also has a capsule receiver station 112 for a capsule 20.

Capsule 20

Figure 5:
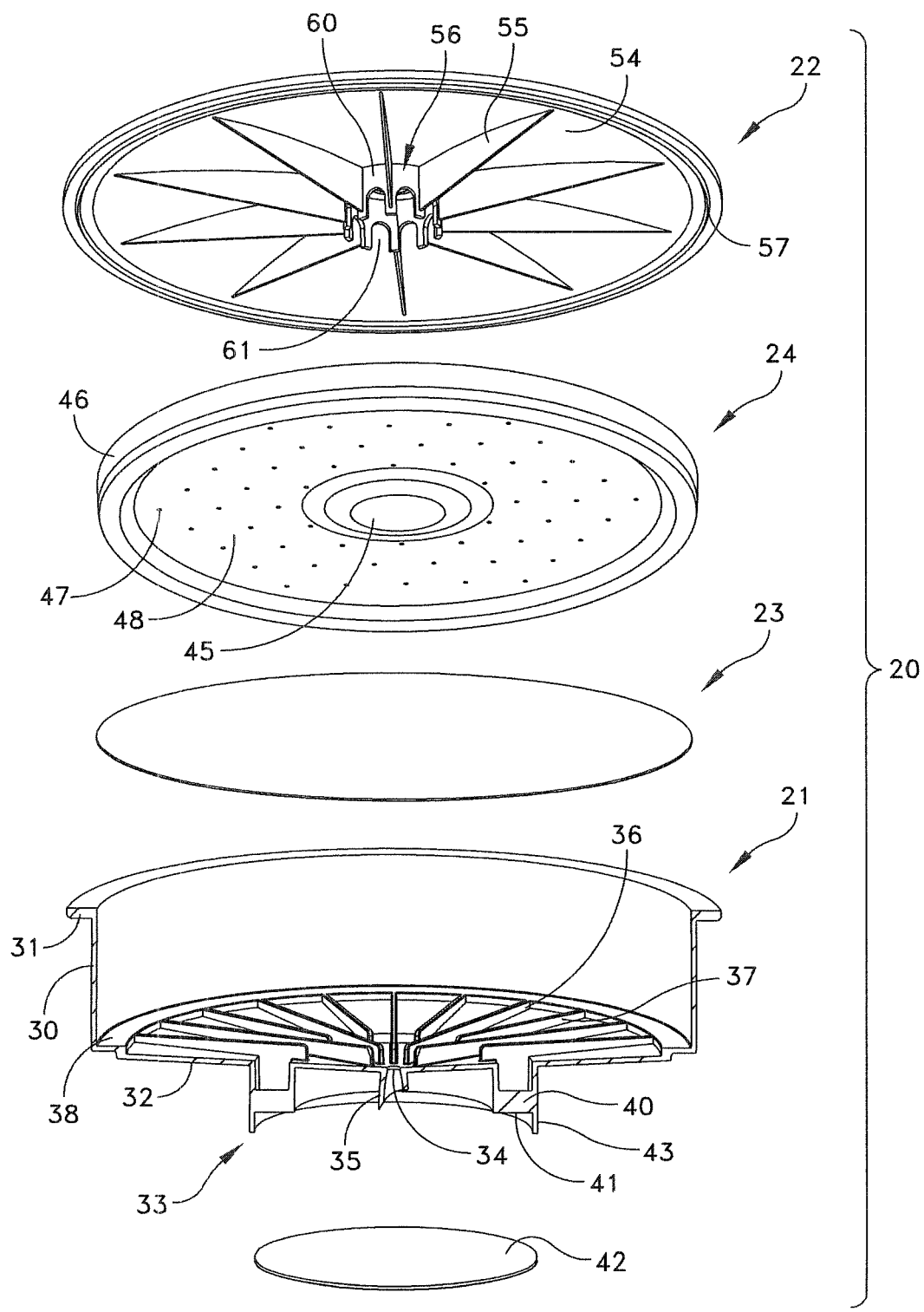
FIG. 5 is an exploded view showing the components of the capsule in FIG. 3 in perspective.
Figure 6:
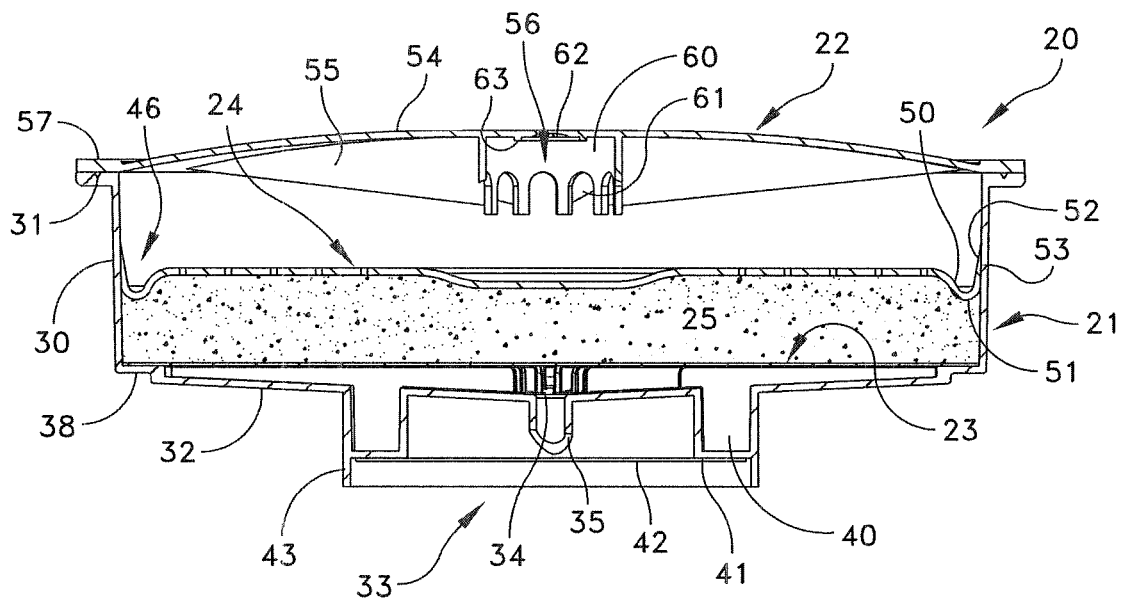
FIG. 6 is a cross-sectional view taken along lines 6-6 in FIG. 3 of an assembled capsule containing a small amount of infusible material.
Figure 7:
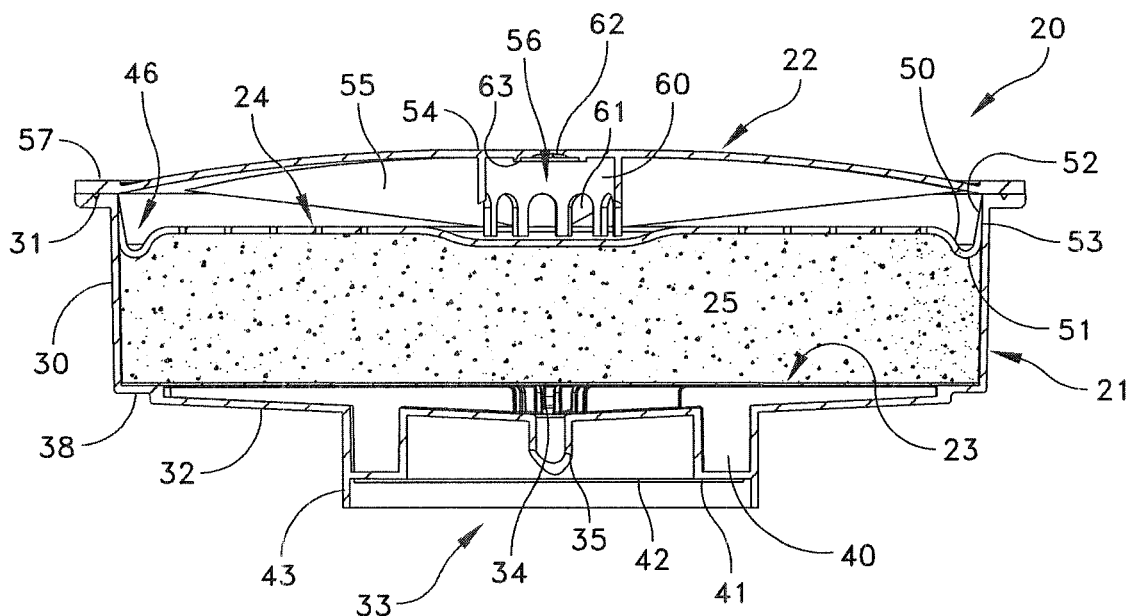
FIG. 7 is a cross-sectional view taken along lines 6-6 in FIG. 3 of an assembled capsule containing a maximum amount of infusible material.

The specific embodiment of the capsule 20 shown in FIGS. 3 through 7 is an integral structure comprising several components. Viewed externally in FIGS. 3 and 4, the capsule 20 includes a capsule base 21 for containing the infusible material and a capsule cover 22. Viewed internally, in FIGS. 5 though 7, the capsule 20 includes a layer of filter paper or a filter 23 and a water distribution plate 24. Infusible material, such as the ground coffee 25 shown in FIGS. 6 and 7, is contained in a cavity intermediate the water distribution plate 24 and the filter 23 and bounded by a side wall 30 of the capsule base 21.

More specifically and still referring to FIGS. 3 through 7, the capsule base 21 has a cup shape with a closed bottom and an open top and includes the side wall 30. A radially outwardly extending flange 31 from the side wall 30 at the periphery of the open top provides a planar annular support surface for the cover 22. As shown in FIGS. 5 through 7, a floor 32 closes the bottom of the capsule base 21 and is slightly concave in shape. A central dispensing structure 33 directs the brewed beverage through a central aperture 34 and a dispensing spout 35 to the cup or other beverage receptacle 103 shown in FIG. 2. In FIGS. 5 through 7, the dispensing spout 35 extends externally, downwardly from the floor 32 to a free sharpened end.

Referring to FIG. 5, the floor 32 includes integral, radially extending, angularly spaced interior ribs 36 and 37. In combination with the concavity of the floor 32, the ribs 36 and 37 form converging, sloping channels from the side wall 30 down to the aperture 34 thereby to channel brewed beverage through the aperture 34 and the dispensing spout 35. A circular ledge 38 at the intersection of the side wall 30 and the floor 32 improves capsule rigidity. The ledge serves as a base to which the filter periphery can be sealed thereby to fix its position in the capsule base 21.

Referring specifically to FIGS. 4 through 7, a rim or collar 40 extends downwardly from the exterior of the floor 32 thereby to form a standoff that is concentric with the spout 35 and spaced proximate thereto. The collar 40 also extends for a distance that is at least the distance the spout 35 extends from the floor 32. The collar 40 thereby surrounds and protects the dispensing spout 35 during handling and storage.

A free end 41 of the collar 40 forms an annular planar support surface 41 for a thin gas impermeable sealing foil 42. The foil 42 seals the spout 35 to assist in maintaining the freshness of the infusible material 25. The foil 42 also prevents an individual from contacting the sharpened end of the spout 35. An adherent material, or other means, fixes the foil 42 to the free end 41. In this embodiment, an outer peripheral cylindrical extension of the collar 40 forms a protective barrier or fence 43. The fence 43 prevents any accidental puncture of the foil 42 by being pushed against the free end of the spout 35 prior to its intentional rupture during the brewing process as will be described later.

Referring particularly to FIG. 5, the water distribution plate 24 is a thin plate with a dimpled center portion 45 and a peripheral positioning structure 46. A plurality of spaced apertures 47 extend through the plate in an annular area 48 between the center portion 45 and the positioning structure 46. Each aperture 47 allows the passage of a brewing liquid, such as water, but blocks the passage of coffee grounds. The collective or total area for all the apertures 47 allows the passage of the volume of liquid being supplied under pressure above the water distribution plate 24 with only a minimal pressure drop.

The positioning structure 46 has a construction that enables a capsule 20 of a given size to accommodate a range of quantities of infusible material. As most clearly shown in FIGS. 6 and 7, the positioning structure 46 has a generally J-shape and slides over the interior surface of the side wall 30 as the water distribution plate 24 is inserted into the capsule 20 against a quantity of infusible material, such as coffee grounds. A predetermined force applied to the plate 24 compacts the infusible material to a specified density. When the force is released, the positioning structure 46, with its downwardly extending leg 50, reverse bend 51 and tail 52 with a preferably feathered outer surface 53, blocks any reverse displacement. Thus, this positioning structure 46 is not dependent upon being locked at a mechanically predetermined position within the capsule base 21. In one embodiment, the capsule base 21 can accommodate up to 18 grams (0.6 ounces) of coffee. FIGS. 6 and 7 depict different configurations of a single version of a capsule with approximately 9 grams and 18 grams of ground coffee respectively.

Now referring to FIGS. 5 through 7, the cover 22 has a dome-like thin circular body 54 with a plurality of angularly spaced, radially extending, tapered ribs 55 extending from a central structure 56 to a peripheral flange 57. The ribs 55 provide structural integrity. A peripheral flange 57 for the cover 22 and the flange 31 on the base 21 are joined to form an integral pressure tight assembly by ultrasonic welding or other techniques.

Figure 3:
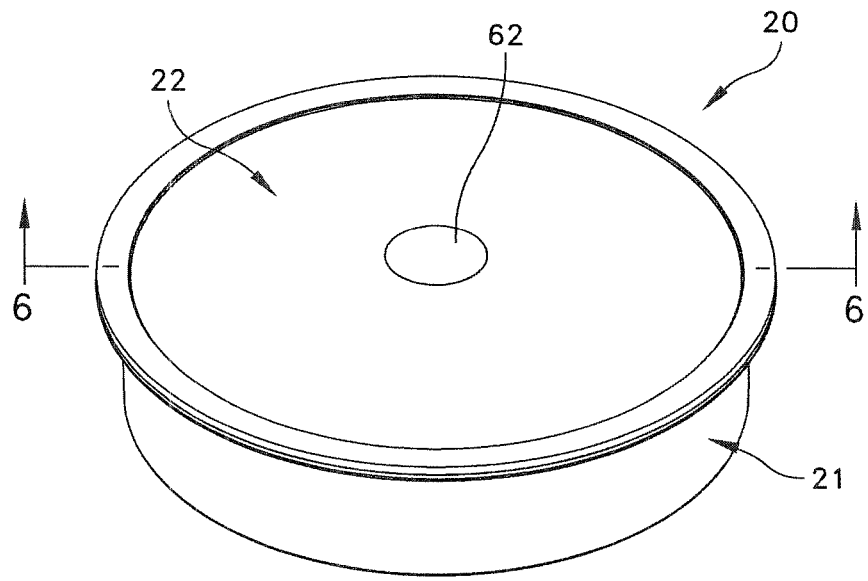
FIG. 3 is a perspective view of a capsule constructed in accordance with this invention.
Figure 4:
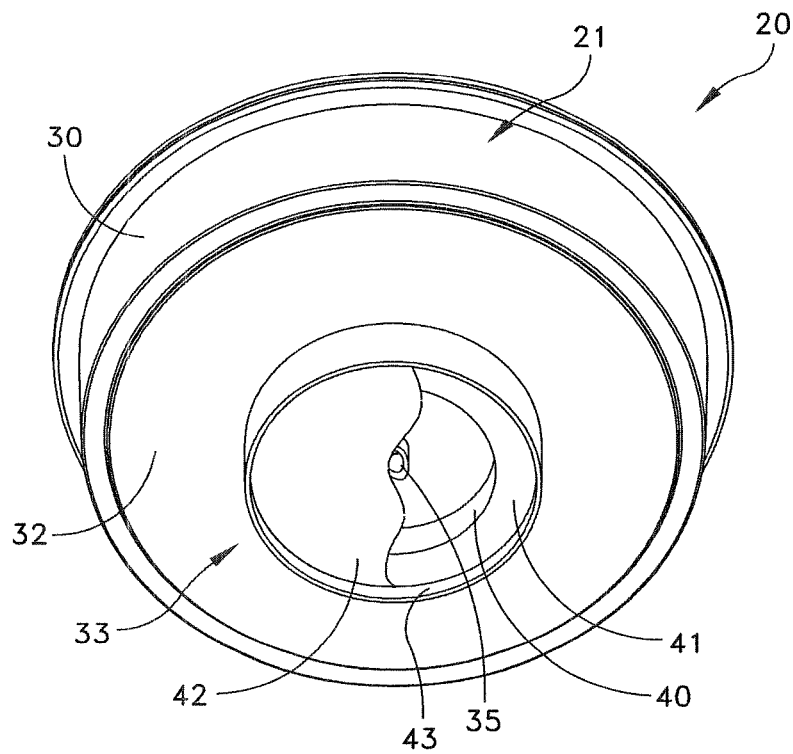
FIG. 4 is another perspective view of the capsule in FIG. 3 with a portion broken away.

As described later, a water supply probe pierces the cover 22 to deliver hot liquid under pressure to the capsule 20. The central structure 56 includes a cylindrical body 60 that depends from the body 54 and terminates with a plurality of radially facing, arched passages 61. As shown in FIGS. 3, 6 and 7, a breakout 62 of the cover 22 is aligned with the cylindrical body 60 to facilitate piercing. As shown in FIGS. 6 and 7, an integral cylindrical barrier 63 surrounds the breakout 62 to block any propagation of the effects of piercing thereby to preclude any impact on the integrity of the cover 22.

Capsule Receiving Station 112

Figure 8:
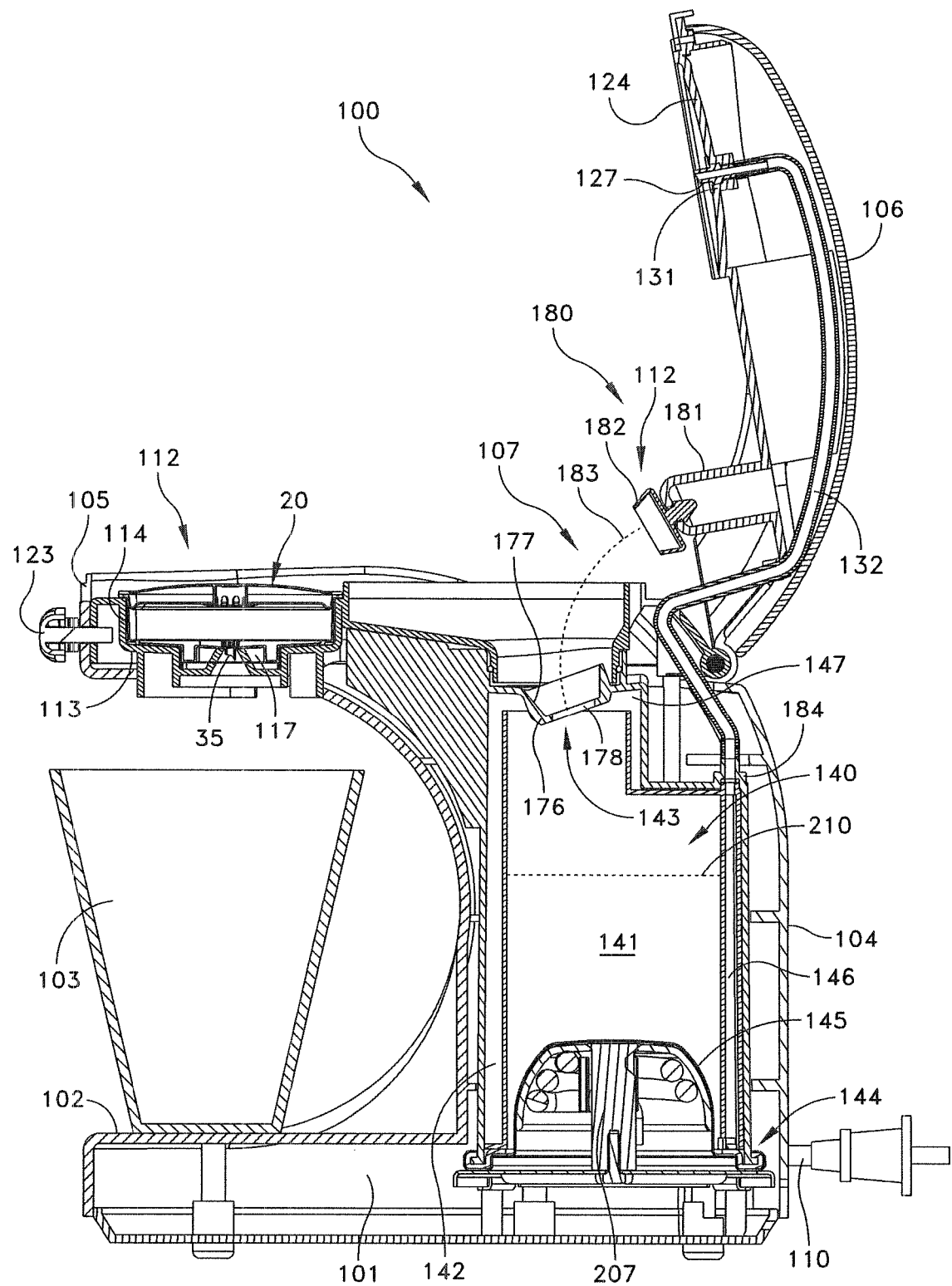
FIG. 8 is a cross sectional view of the beverage brewing apparatus taken along lines 8-8 in FIG. 1 with an open lid.
Figure 9:
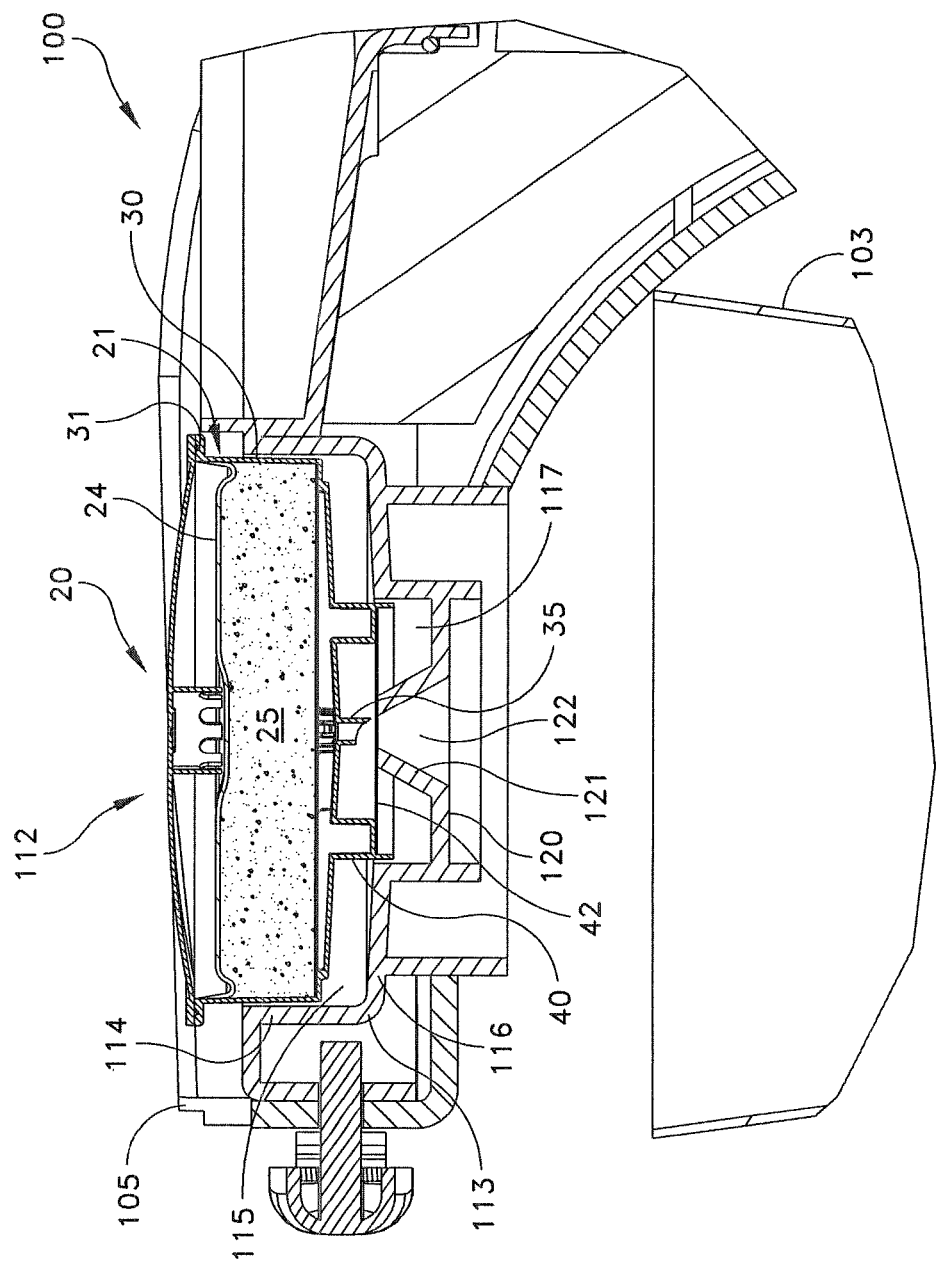
FIG. 9 is an enlarged sectional view of a portion of the beverage brewing apparatus of FIG. 8.

Referring again to FIG. 2, when the lid 106 of the brewing apparatus 100 is open, a user places a capsule, like capsule 20, into the capsule receiver station 112 located in the upper housing 105 also shown in FIGS. 8 and 9. Referring specifically to FIGS. 8 and 9, the capsule receiver station 112 includes a cup-shaped receiver 113 with a cylindrical side wall 114. As shown most clearly in FIG. 9, the cup-shaped receiver 113 forms a well 115 that closely fits the capsule side wall 30. A floor 116 has a central opening 117 formed by an annular depending channel 120 with an inner frustoconical wall 121 that forms an inverted funnel-like opening 122. At the top of the frustoconical wall 121, also shown in FIG. 11, the opening 117 has a diameter that is larger than the diameter of the spout 35. The outer diameter at the base of the wall 121 is less than the inner diameter of the collar 40. As shown in FIG. 9, when a user places a capsule 20 in the capsule receiver station 112, the upper surface of the frustoconical wall 121 initially supports the capsule 20 at the foil 42. So the capsule 20 remains sealed resting in the capsule receiver station 112.

Figure 10:
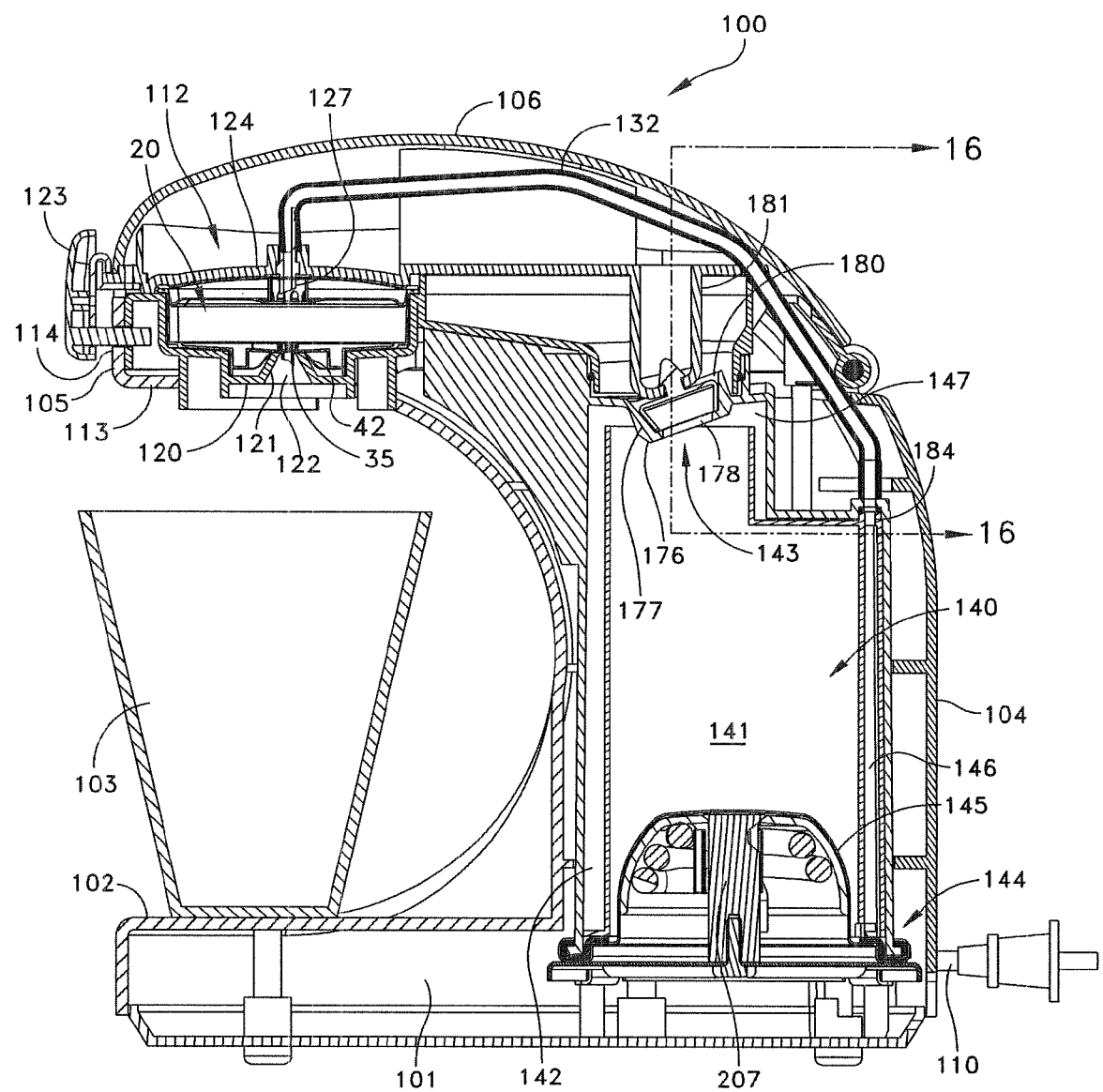
FIG. 10 is a cross sectional view of the beverage brewing apparatus corresponding to the view in FIG. 8 with a closed lid.
Figure 11:
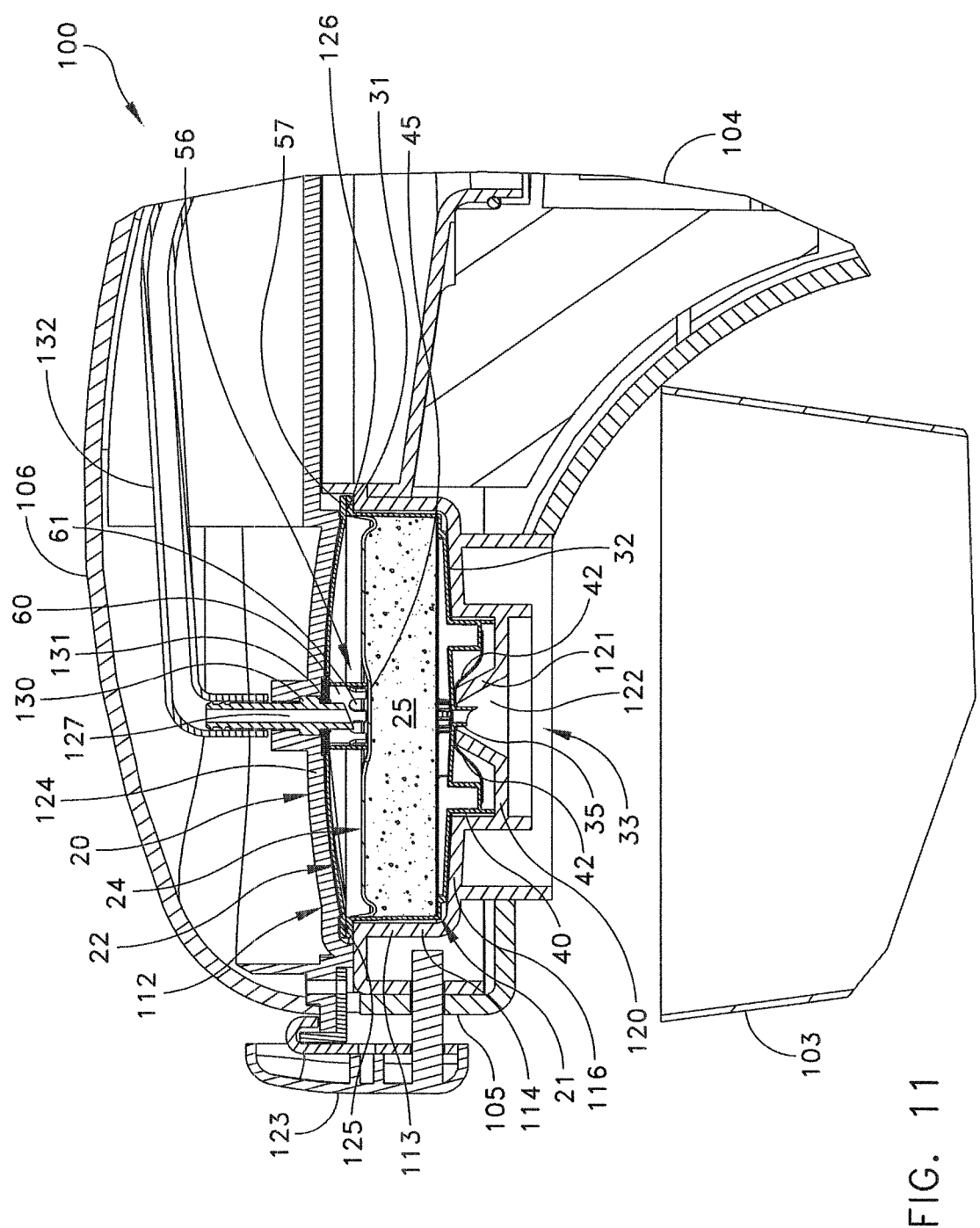
FIG. 11 is an enlarged sectional view of a portion of the beverage brewing apparatus of FIG. 10.

Next, and referring to FIGS. 10 and 11, the user closes the lid 106 and uses a latch 123 to fix the lid 106 in a latched position. The lid 106 includes a cover member 124 with a smooth inner surface and an annular peripheral clamping surface 125 shown in FIG. 11 and aligns with a free edge 126 of the sidewall 114 for the receiver member 113. The lid 106 also supports a water delivery probe 127 with a central body portion 130 and a seal, a flat annular seal 131 in this embodiment. The water delivery tube attaches to a hot water delivery tube 132 from a pressurized hot water delivery system that delivers hot water under pressure to the probe 127.

Still referring to FIGS. 9 and 10, as the user closes and latches lid 106, several actions occur essentially simultaneously. For example, the water delivery probe 127 penetrates the cover 22 through the breakout 62, as shown in FIG. 3. When the lid 106 is latched in position as shown in FIGS. 10 and 11, the flat seal 131 seals the cover 22 to the cover member 124.

As the cover member 124 exerts a downward force on the cover 22, the capsule 20 displaces downward into the capsule receiving station 112. This causes the frustoconical wall 121 to rupture the foil 42 over the sharpened spout 35 and to expose the open spout 35 in the central opening 122. This downward motion continues until the capsule base floor 32 seats on the floor 116. The collar 40 then lies positioned in the annular channel member 120.

As the lid 106 latches, the capsule 20 is firmly held inside the cavity defined by the receiver member 113 and the cover member 124, with the center of its cover 22 proximate the flat annular seal 131. There is a closed path for liquid from the delivery tube 132, through the probe 127 and the capsule 20 to the spout 35. Both the hot water and brewed beverage are confined to the interior of the capsule 20. The brewed beverage does not contact any portion of the apparatus 100.

As will now be apparent, the combination of the disclosed capsule 20, capsule receiving station 112 and lid 106 enables a brewing apparatus, such as the brewing apparatus 100, to achieve some of the objectives of this invention. Specifically, no brewed beverage or coffee grounds contact any part of the apparatus. Therefore, only minimal maintenance including light cleaning is required between uses. The ability to merely add water, place the capsule, clamp a lid and turn on a switch facilitates ease of use.

The Pressurized Hot Liquid Delivery System

Figure 12:
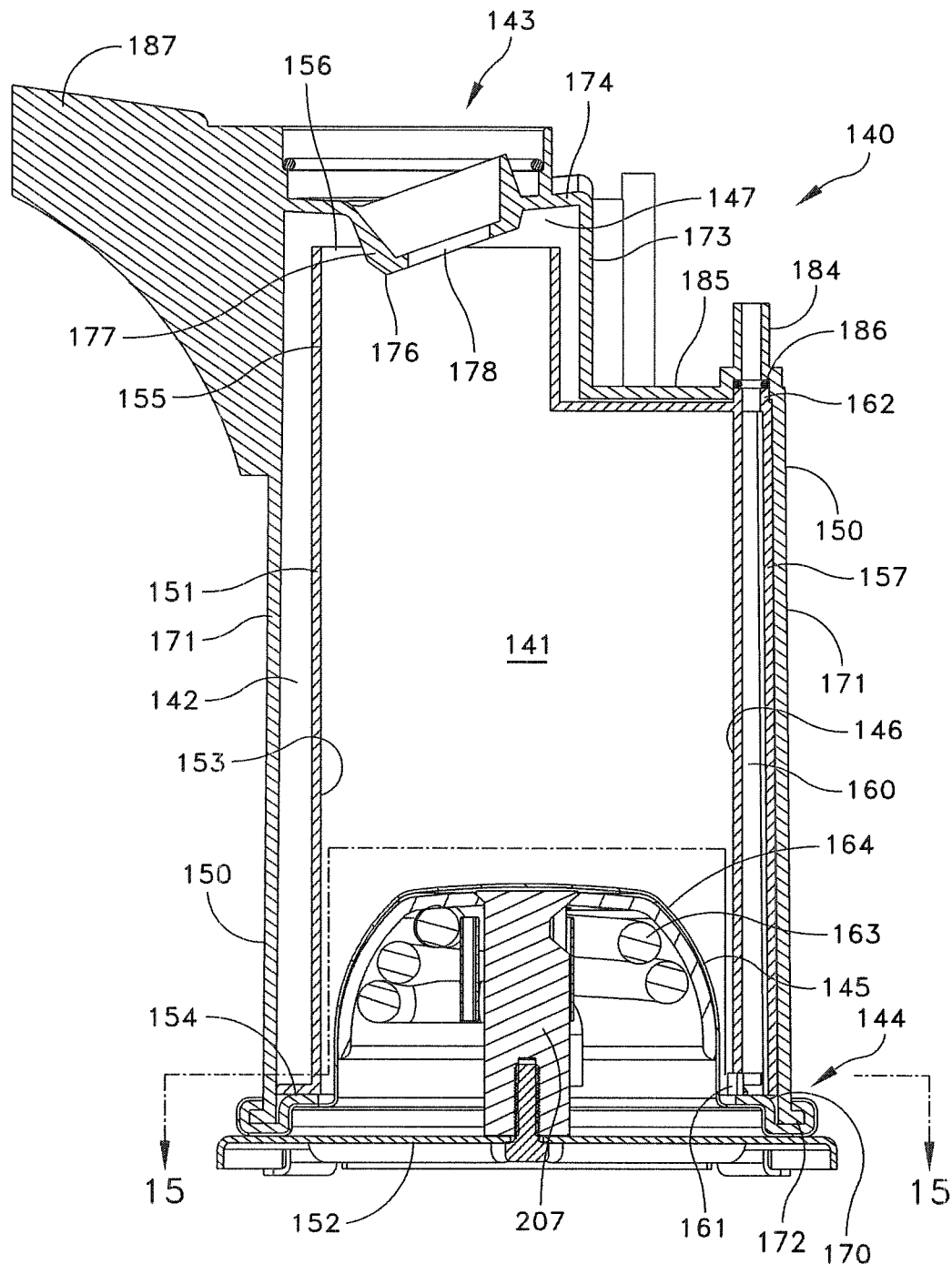
FIG. 12 is a cross sectional view of a pressurized hot water delivery system included in the beverage brewing apparatus shown in FIG. 8.
Figure 13:
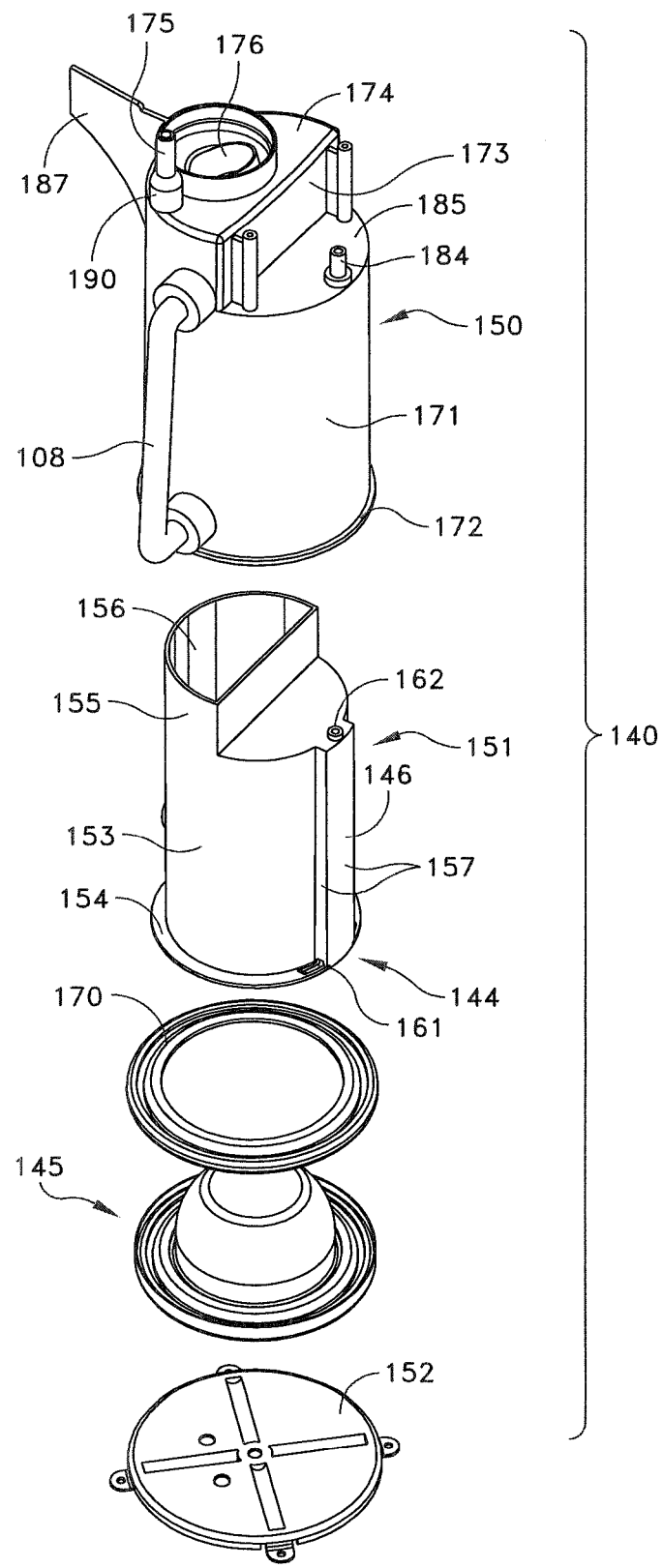
FIG. 13 is an exploded view of a portion of the pressurized hot water delivery system shown in FIG. 12.

As will be apparent, any number of a variety of known combinations of boilers and pumps could be used to supply pressurized hot water to the water delivery probe 127 through the delivery tube 132 in FIG. 11. However, in accordance with this invention, a pressurized hot liquid delivery system provides liquid at an acceptable brewing temperature without the need for a mechanical pump. FIGS. 8 and 10 and particularly FIGS. 12 and 13 depict a pressurized hot water delivery system 140 that includes a first, or inner, tank volume 141 and a second, or outer, tank volume 142. A tank inlet 143 directs cold tap water, or the like, at an inlet temperature into the system 140. As one function, a port network 144 allows the cold tap water to pass between the first and second tank volumes 141 and 142 to maintain the same water level in each tank volume.

A heater 145, located at the bottom of the first tank volume 141, boils water in the first tank volume 141. When the inlet 143 is sealed this produces steam under pressure. During this time water in the second tank volume 142 remains substantially at the input temperature. The first and second tank volumes 141 and 142 open to a common chamber 147 that provides hydraulic communication above the water level so the pressure above the water level acts equally on the surfaces of the water in both the tank volumes 141 and 142.

When the inlet 143 is sealed, the pressure rises as the water reaches its boiling point and the flow through the capsule creates a back pressure. It was found that the combination of a delivery rate of about 400 milliliter of water per minute and of a typical capsule filled with about 14 grams of finely ground coffee (400-500 mesh) creates a hydraulic resistance equal to about 1 bar over atmospheric pressure. At this pressure the boiling point of water is about 120° C. The water in the second tank volume is at the original input temperature, typically about 20° C. The relative volumes of the tank volumes 141 and 142 are selected so that when water from the tank volumes 141 and 142 mixes, it produces water in a water mixer 146 at an acceptable brewing temperature in the range 90° to 96° C. Stated differently, the ratio of the water in the first and second tank volumes 141 and 142 corresponds to the ratio of the temperatures of the water in the first tank volume 141 and in the second tank volume 142.

Specifically, the relationship between the temperatures of the water in the tank volumes 141 and 142 and the temperature of the delivered water temperature is:

$$(PT_1)+[(100-P)T_2]=100T_3$$

where $T_1$ and $T_2$ are the temperatures of the water in the tank volumes 141 and 142, respectively, where $T_3$ is the desired water delivery, or acceptable brewing, temperature and where P represents the percent of the water to be contained in the tank volume 141. Assume, for example, that $T_1$ and $T_2$ have values of 120° C. and 20° C., respectively and that the desired water delivery temperature $T_3$ is 92° C. This result is that P=72. That is, the tank volumes 141 and 142 should be sized so that 72% of any cold water in the tank volumes is heated in the first tank volume 141 while the remaining 28% remains essentially unheated in the second tank volume 142. As the pressure on water surface in the two tank volumes is equal, the pressure causes the water to discharge through the port network 144 to combine in the water mixer 146 in a corresponding ratio. From the water mixer 146, the pressurized hot water at the acceptable brewing temperature transfers through the delivery tube 132 to the water delivery probe 127 as shown in FIG. 10.

As known, the temperature of tap water can vary. Further some heat will transfer to the water in the tank volume 142 during boiling. However, these variations produce only a minimal effect on the temperature of delivered water. For example, in the foregoing example, a shift of 10° C. in the water temperature in the tank volume 142 from the nominal temperature only shifts the temperature of the mixed water by 2.8° C.

Figure 14:
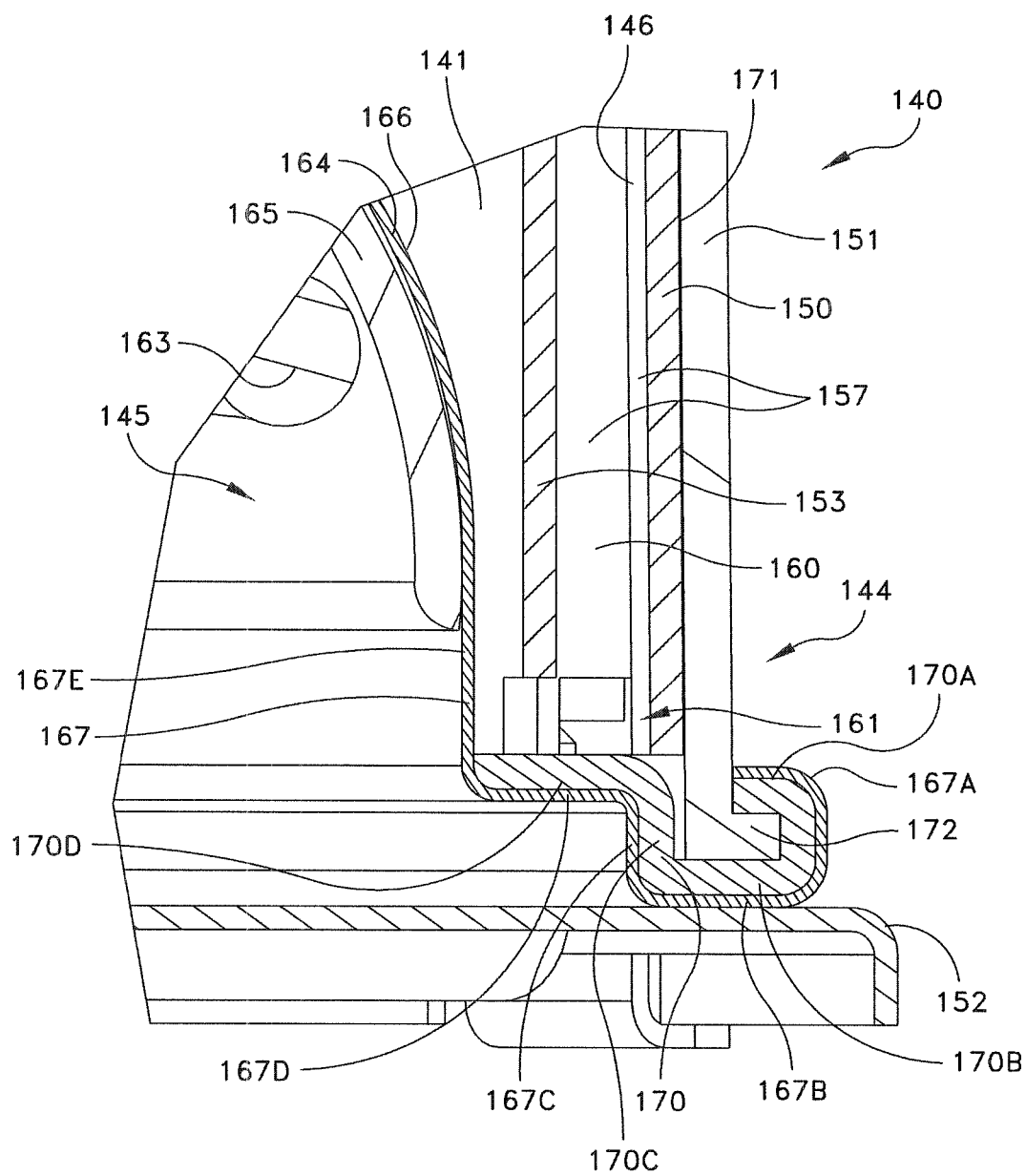
FIG. 14 is enlarged cross sectional view of a portion of the system shown in FIG. 12.

Referring particularly to FIGS. 12 through 15, the delivery system 140 includes an outer tank 150 and an inner tank 151 that is spaced from the outer tank 150. As shown in FIGS. 12 through 14, the inner tank 151 overlies the heater 145 that attaches to a bottom plate 152 to form an integral assembly. Now referring to FIGS. 12 and 13, the inner tank 151 includes a cylindrical wall portion 153 that extends from a bottom flange 154. A semi-cylindrical extension 155 extends above the cylindrical wall portion 153 and forms an open top 156. The water mixer 146 is formed integrally with the cylindrical wall portion 153 by walls 157 that form a channel 160 from ports 161 at the bottom of the tanks 150 and 151 to an exit port in the form of a nipple 162 that extends to the exterior of the inner tank 151.

Figure 15:
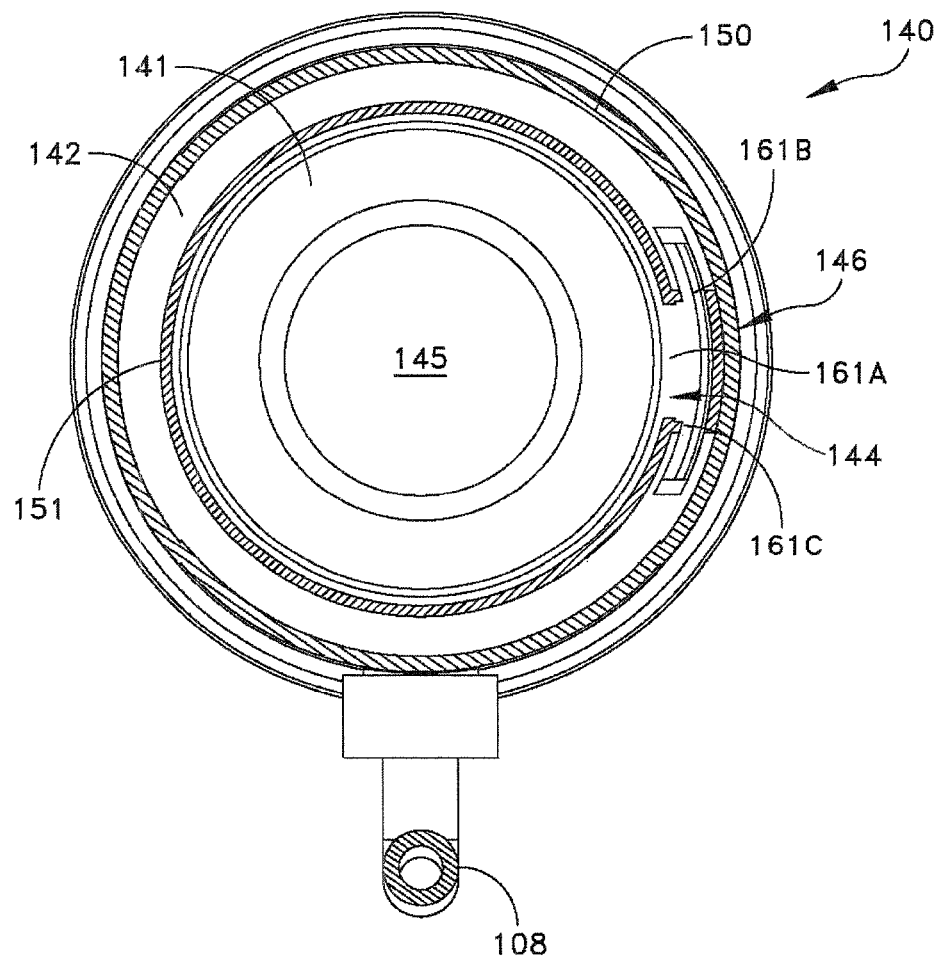
FIG. 15 is a cross sectional view taken along lines 15-15 of FIG. 12.

As most clearly shown in FIG. 15, the port network 144 comprises three ports at the base of the water mixer 146 that establish flow paths with the first and second tank volumes 141 and 142 and the water mixer 146. In the port network 144, a first port 161A provides a passage between the water mixer 146 and the inner tank volume 141. Ports 161B and 161C provide passages to the outer tank volume 142 on opposite sides of the water mixer 146 and lie in the second volume 142 between the tanks 150 and 151. The cross-section areas of the individual ports are not critical because the pressure drop through them is small in comparison with the hydraulic resistance of the capsule. In a preferred embodiment, the ratio of the cross sectional area of the port 161A to the total areas of the ports 161B and 161C is the same as the ratio of the volumes 141 to 142 described above so the velocities of liquid through the ports 161A, 161B and 161C are substantially equal.

Referring now to FIG. 14, the heater 145 is electrically powered and includes a resistor heating element 163 under a laminated domed housing 164 comprising an inner aluminum shell 165 and an outer stainless steel cover 166. Aluminum facilitates the even transfer of heat from the heating element 163. Stainless steel minimizes the buildup of scale and other debris on the surface but, due to the thinness of the cover 166, provides minimum barrier to heat transfer. Consequently, there is an efficient transfer of heat from the heating element 163 to water in the inner tank volume 141. The stainless steel layer 166 extends downward beyond the aluminum shell 165 to form a skirt 167 that, with a seal 170, seals the bottom flange 154 of the cylindrical portion 153 to the extension of the skirt 167.

Now referring to FIGS. 12 and 14, the outer tank 150 includes a cylindrical body portion 171 with a bottom flange 172. As shown more clearly in FIG. 14, portions 170A and 170B of the seal wrap around the flange 172. The portion 170B lies under the flange 172. A vertical transition 170C connects the portion 170B to a horizontal end portion 170D that closes the bottom of the tank volumes 141 and 142, the port network 144 and the water mixer 146, to prevent hot water from volume 141 from mixing prematurely with cold water in volume 142.

Portions 167A through 167D of the skirt 167 overlie the seal 170. The portions 167A and 167B can be crimped to affix the seal portions 170A and 170B to the flange 172. Thus, the seal 170 and skirt 167 seal the tank volumes 141 and 142 along with the channel 160 in the water mixer 146. Another skirt portion 167E offsets the seal 170 from the heating element 163 and aluminum shell 165. As the cross-sectional area of the skirt portion 167E is thin and the length is relatively long, portion 167E minimizes any heat transfer to the seal 170 and the tanks 150 and 151 thereby thermally isolating the hot portions of heating element 145 from other structures, so they remain cool during normal operations. Thus, the pressurized hot water delivery system 140 is a sealed subassembly to which water can be added through the inlet 143.

Figure 16:
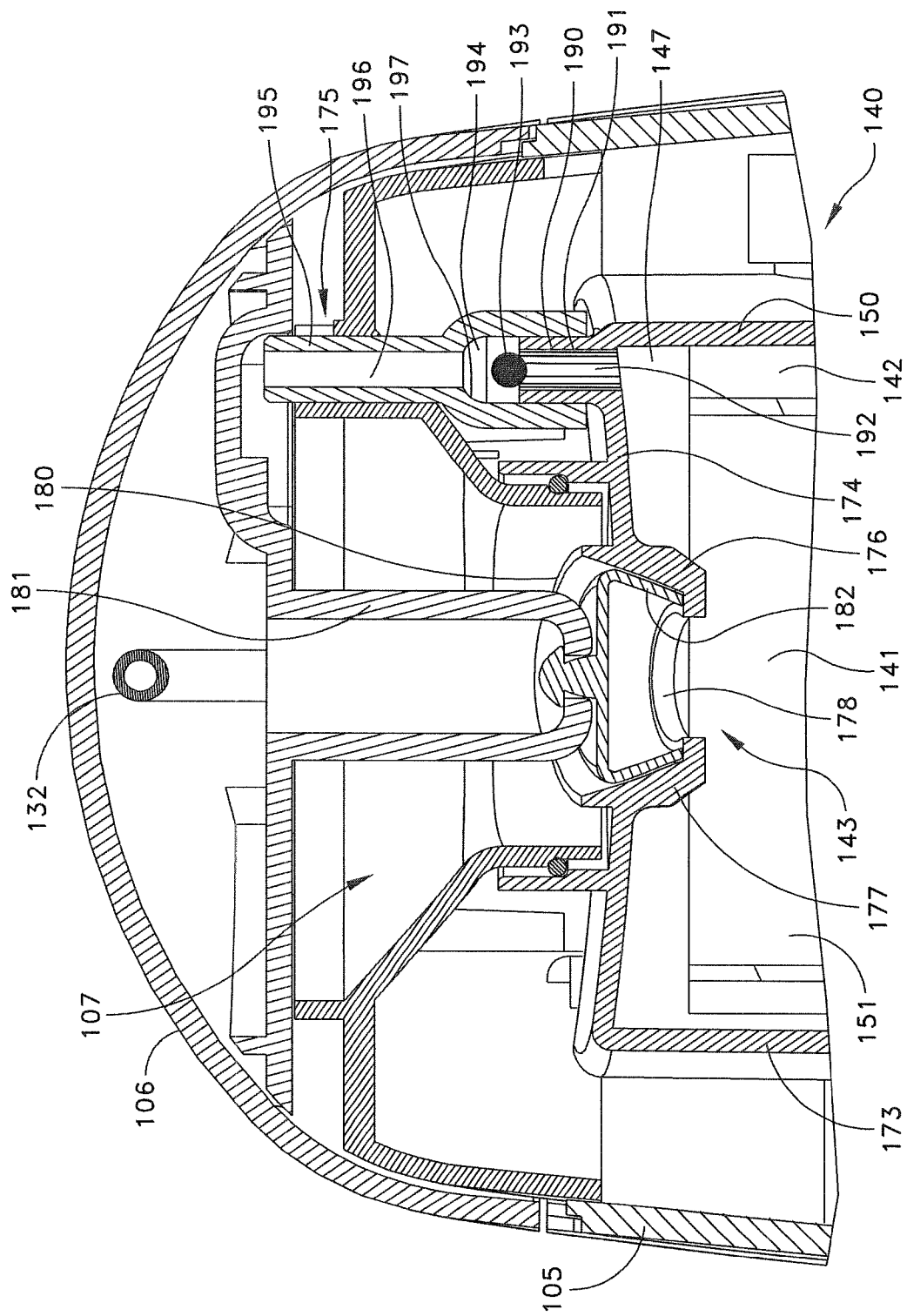
FIG. 16 is an enlarged cross sectional view of a portion of the beverage brewing apparatus taken along lines 16-16 in FIG. 10.

Now referring to FIGS. 12 and 13, the outer tank 150 also includes a closed top 174 and may include a vent 175, described later. The closed top 174 also includes a canted cup-shaped receiver 176 with a tapered side wall 177 and an opening 178 therethrough as part of the sealable inlet 143. The receiver 176 aligns with a corresponding sealing structure 180 as shown in FIGS. 8, 10 and 16. As more clearly shown in FIGS. 8 and 16, the sealing structure 180 extends from a support 181 extending from the lid 106 and carrying a cup-shaped member 182 with an inwardly tapered wall. When the lid 106 closes, as shown in FIG. 16, along a path 183, shown in FIG. 8, the tapered walls 177 and 182 interface to seal the inlet 143. As pressure builds inside the tank volumes 141 and 142 and the common chamber 147, it reinforces the sealing pressure exerted by the wall 182 against the wall 177.

In this embodiment the sealing structure 180 is also canted with respect to the general plane of the lid 106. The degrees of cant in each of the sealing members 180 and the inlet 143 are selected so that as the lid 106 closes and the sealing member 180 travels along the path 183 to mate properly with the receiver 176.

As particularly shown in FIGS. 12 and 13, the semi-cylindrical sections 155 and 173 are sized to interengage and provide proper alignment between the outer tank 150 and inner tank 151 with the proper spacing between the cylindrical walls 153 and 171. This alignment also assures that the nipple 162 aligns with another nipple 184 extending through a closed top surface 185 of the outer tank 150. As particularly shown in FIG. 12, an O-ring seal 186 positioned on top of the nipple 162 provides an integral seal so the nipple 184 constitutes an extension of the water mixer 146 and connects to the delivery tube 132 as shown in FIG. 8. Still referring to FIGS. 12 and 13, a wing 187 extends radially from the outer tank 150 diametrically opposite the nipple 184. This wing 187 provides proper support for the upper housing 105 within the vertical housing 104.

The vent 175 in FIG. 13 is most clearly shown in FIG. 16. It includes a base 190 extending from the top portion 174 of the outer tank 150. The base 190 forms a passage 191 with a plurality of axially extending ribs 192 angularly spaced about the interior of the passage 190. A spherical operator 193 normally rests on the top of the ribs 192 in an intermediate chamber 194 formed by the base 190 and a chimney 195 with a passage 196. At the entrance of the passage 196 the chimney 195 has an internal spherical valve seat 197.

When the spherical operator 193 is in its lower position shown in FIG. 16, gas can escape through the passage 190 and 196 by way of channels between the ribs 192. Such discharge would occur for example, while a user adds water through the open inlet 143. It would also occur during the heat up period, during which air above the water expands, and during the initial portion of a boiling cycle as the water in the inner tank volume 141 begins to generate steam vapor. As the top of the chimney 195 exits in the receiving station 107, any steam condensation collects in the receiving station 107. As steam is generated at a higher rate, the steam velocity through the vent 175 increases. At some velocity, the spherical operator 193 rises against the seat 197 to close the vent 175. When this occurs, the steam pressure in the common chamber 147 continues to block any flow of steam through the vent 175. As the steam pressure begins to build further, water in the tank volumes 141 and 142 discharges through the port network 144 to mix in the channel 160 and to be transported to the delivery probe 127 in FIGS. 10 and 11, as previously described.

Control System

Figure 17:
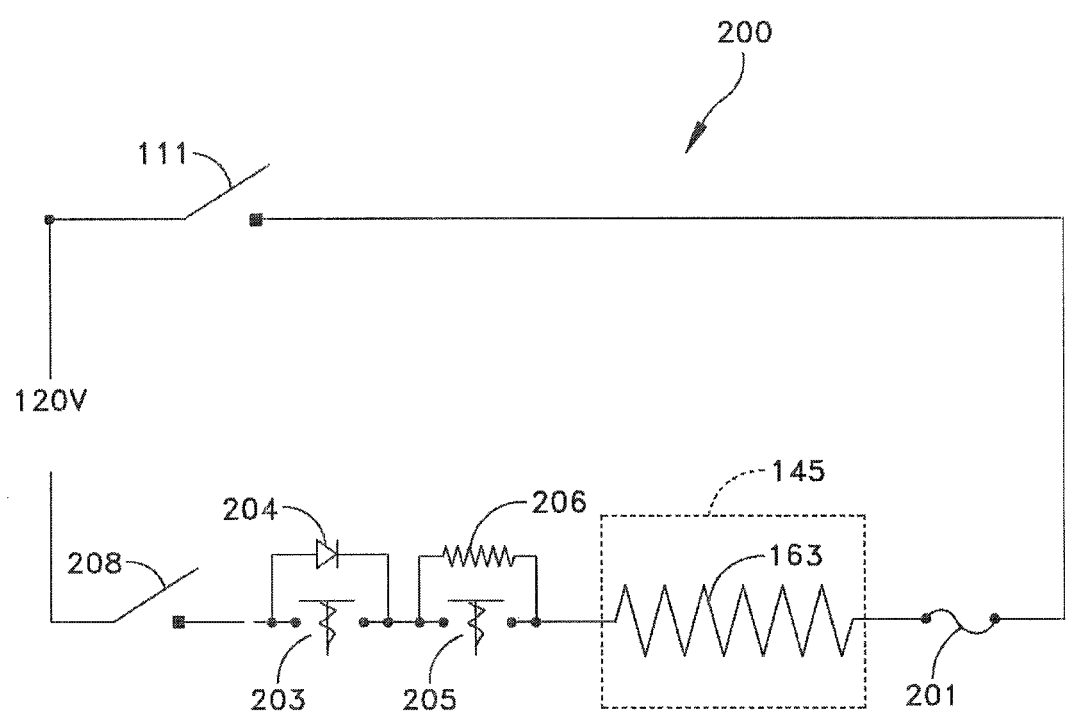
FIG. 17 is a schematic of a control system for the beverage brewing apparatus shown in FIG. 1.

FIG. 17 depicts a simple and inexpensive control circuit 200 for incorporation in this brewing apparatus. The power cord 110, shown in FIG. 1 for example, connects the control circuit 200 to a power source. The switch 111 is in a series circuit with a fuse 201, the resistive heating element 163 in the heater 145, a first normally closed thermostatic switch 203 in parallel with a diode 204 and a second normally closed thermostatic switch 205 in parallel with a high resistance auxiliary heater 206. Both thermostatic switches mount to a plate 207 shown in FIG. 12. A lid closure switch 208 conducts when the lid 106 is closed and latched. The exact placements and connections of the elements of this control circuit 200 are not shown but will be obvious to those of ordinary skill in the art.

Each thermostatic switch shifts to an open circuit state when the temperature of the post 207 reaches a particular set point. The set point for the thermostatic switch 203 corresponds to a water temperature of about 100° C. Thus, when the heater 145 in FIG. 12 raises the water temperature in the tank volume 141 to 100° C., the switch 203 opens and cuts the power in half due to the introduction of the diode as a half-wave rectifier in series with the resistive heating element 163. This feature allows rapid heating of the water to its boiling point at atmospheric pressure and then reduced heat generation to slow down the rate of steam generation to achieve a desired delivery rate of hot water to the brewing station.

As the water discharges from the tank volume 141, the water level eventually falls below the top of the heater 145 in FIG. 10. The post temperature then rises to a second set point that is higher than the first set point, for example, a post temperature of 130° C. The thermostatic switch 205 then terminates the brewing cycle by essentially deenergizing the resistive heating element 163. When the thermostatic switch 205 opens, the auxiliary heater 204 energizes to maintain the thermostatic switch 205 at a temperature above its closing point and to maintain its non-conducting state. This prevents cycling on and off while the switch 111 is still in its closed position. When, however, the user turns off the power switch 111 or opens lid closure switch 208 by lifting the lid 106, the auxiliary heater 204 is deenergized so the thermostatic switch 205 cools and closes to be ready for the next brew cycle.

Operation

Now referring to the operation of a brewing apparatus 100 using a capsule 20 and initially referring to FIG. 2, a user places a capsule 20 into the capsule receiving station 112 and pours cold tap water into the water inlet station 107 as previously described. During this process air escapes through the vent 175. Water fills the tank volumes 141 and 142 of FIG. 8 and the mixing tube 146 to a common level because the volumes 141 and 142 and the mixing tube 146 are open to the atmosphere through various paths. In FIG. 8 a dashed line 210 indicates a typical water level in the tank assembly.

Next the user closes and latches the lid 106 in the position shown in FIG. 10. As previously described, the water delivery probe 127 now penetrates the top cover of the capsule 20. The inner wall 121 has ruptured the seal 42 and exposed the spout 35. The switch 208 of FIG. 17 has closed. The cover member 124 along with the flat seal 131 has formed a sealed structure so there is a closed delivery water path from the tank volumes 141 and 142 to the interior of the capsule 20.

Next the user activates the switch 111 whereupon the heater 145 is fully energized to promote rapid heating. During this process the dome shape of the heater 145 produces thermal currents that deliver the hot water throughout the tank volume 141 to promote a uniform temperature in the water. The vent 175 relieves any pressure increase because the spherical operator 193 is at its lower position.

About the time the water in the tank volume 141 begins to boil, the thermostatic switch 203 opens and reduces the power to the heater 145 by 50%. Eventually the steam escaping through the vent 175 moves the spherical operator 194 into the spherical seat 197 thereby fully sealing pressurized hot water delivery system 140.

The vapor pressure builds up in the common chamber 147 to about 1 barg, with a corresponding boiling point of about 120° C. Steam pressure on water in the tank volumes 141 and 142 of about 1 barg overcomes the hydraulic resistance of the coffee grounds in the capsule 20 and produces a predetermined flow rate of about 400 milliliter per minute. Consequently the water emerges from the ports 161A, 161B and 161C to pass through the water mixer 146, the delivery tube 132 and probe 127 to infuse the coffee grounds in the capsule 20. Brewed beverage dispenses from the spout 35 into the beverage receptacle.

Figure 18:
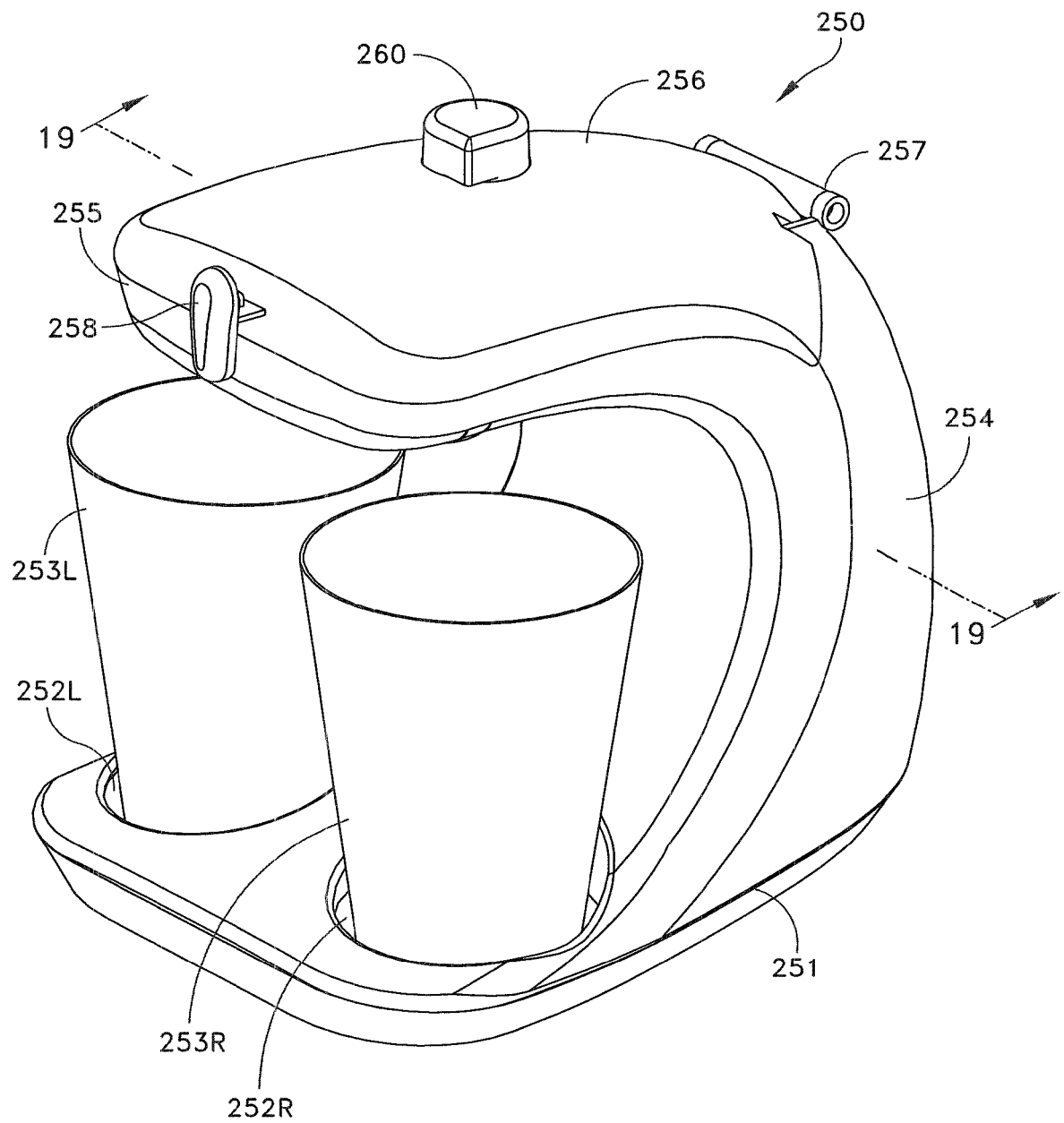
FIG. 18 is a perspective view of an alternate embodiment of beverage brewing apparatus constructed in accordance with this invention.
Figure 19:
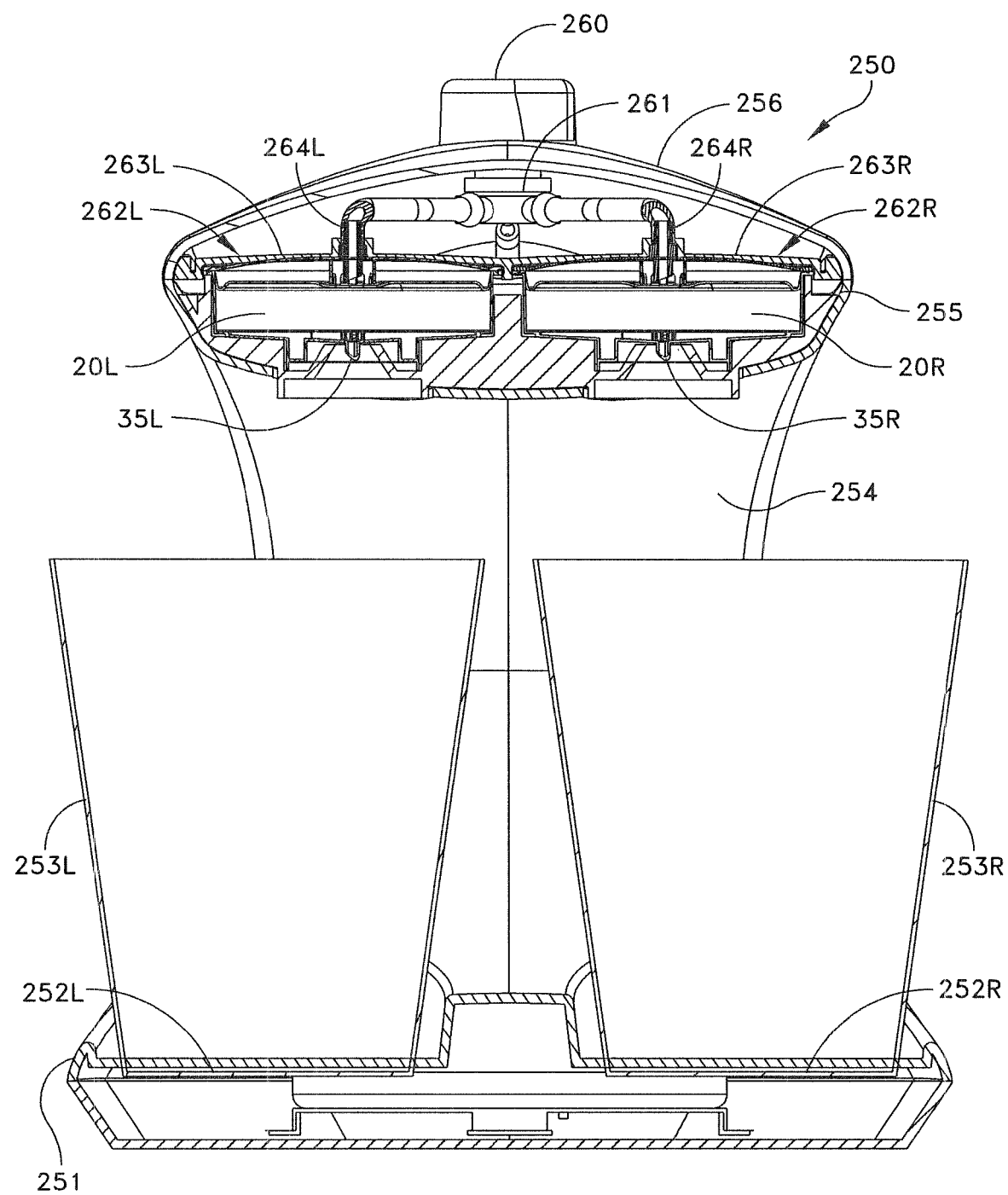
FIG. 19 is a sectional view taken along lines 19-19 in FIG. 18.

When nearly all the water has been discharged from the tank volume 141 and has exposed the heater 145, switch 205 opens and effectively terminates any heating by the heater 145. This ends the brewing cycle, so that the user can remove the receptacle 103 with the brewed beverage Brewing System for Two Servings FIGS. 18 and 19 present a variation on the brewing apparatus 100 shown in FIGS. 1 and 2 that can fill one or two receptacles with a beverage by infusing a material with pressurized hot water from a single source, such as the pressurized hot water delivery system 140 of FIGS. 12 and 13. In this particular embodiment the apparatus 250 includes a base housing 251 with left and right platform stations 252L and 252R, respectively. As shown, the platform stations are adapted to carry beverage receptacles 253L and 253R, respectively. An upstanding housing 254 houses a pressurized hot water delivery system that includes a delivery tube like the delivery tube 132 in FIGS. 8 and 10. An upper housing 255 cantilevers over the platform stations 252L and 252R and includes a lid 256 rotatable between the closed position shown in FIGS. 18 and 19 and an open position about a hinge 257. A latch 258 locks the lid 256 in a closed position.

In this particular embodiment a selector knob 260 mounts on the lid 256 and controls a three position valve 261 that has a right position as shown in FIG. 18, a center position and a left position. The knob 260 and valve 261 control the flow of pressurized hot water from the delivery tube to one of two capsule receiving stations 262L and 262R each being shown as containing a capsule 20L and 20R respectively in FIG. 19. Each of the capsule receiving stations 262L and 262R has a construction that is similar to the capsule receiving station 112 shown in FIGS. 8 and 9. Covers 263L and 263R mounted in the lid 256 overlie the capsule receiving stations 262L and 262R, respectively. Each of the covers 263L and 263R carries a water delivery probe 264L and 264R, respectively, that connects to two valve outlets.

The position of the knob 260 controls whether pressurized hot water is directed to one of the capsule receiving stations 262L or 262R or both. That is, when the control knob 260 is oriented as shown in FIG. 18, the valve 261 diverts all hot water to the water delivery probe 264R so beverage only discharges into the receptacle 253R. When the control knob 260 is at the other end position, the valve 261 diverts all hot water to the water delivery probe 264L so beverage only discharges into the receptacle 253L. When the knob 260 is in its center position, the valve 261 sends water to both the water delivery probes 264L and 264R so beverage discharges simultaneously into both the receptacles 263L and 263R respectively.

As will be apparent, this apparatus shown in FIGS. 18 and 19 can be readily adapted for filling either one cup or two cups simultaneously. Further, the brewed beverage from each capsule can be different as for example caffeinated coffee from capsule 20L and decaffeinated coffee from the capsule 20R. In each case during operation beverage will emerge from the spouts 35L and 35R of the capsules 20L and 20R without contacting the apparatus 250.

As can now be appreciated, brewing apparatus constructed in accordance with the various aspects of this invention satisfies all the objectives of this invention. Specifically, the brewing apparatus meets all the market requirements for brewing apparatus that provides individual servings. The brewing apparatus infuses a material with hot liquid under pressure at a brewing temperature within an acceptable brewing temperature range. Brewing is accomplished by a hot liquid under pressure without the need for any mechanical pump. Controls for operating the brewing apparatus are very simple. Specific embodiments of this invention can be compact, reliable to operate and inexpensive to manufacture. Further, the implementations of this invention provide a hot beverage brewing apparatus that minimizes the need for regular cleaning and other maintenance.

This invention has been disclosed in terms of certain embodiments and variations on those embodiments. It will be apparent that many modifications can be made to the disclosed apparatus without departing from the invention. For example, FIGS. 1 and 2 disclose apparatus with a specific configuration. The various components of this invention could be placed in a housing that has an entirely different configuration. This specific implementation of the pressurized hot water delivery system shown in FIGS. 12 and 13 can be modified. For example, it is possible to provide the same operation using separated tanks provided a method of maintaining equal pressure on the liquid in both tanks is provided. A specific heater assembly 145 that is particularly advantageous in such apparatus is shown. Other heating apparatus might be substituted. FIG. 17 discloses a simple control system. In other implementations a similar or more complicated control system might be used to incorporate other features. The pressurized hot water delivery system includes a vent. Different vent structures might be substituted. The system might be constructed without any vent structure. Pressure relief valves might also be used to control or limit steam pressure during brewing. Further, modifications that will adapt the apparatus, particularly the hot water delivery system, to dispense other liquids will be apparent to those of ordinary skill in the art.

Brewing apparatus might also be constructed using some, but not all of the features described above with the attainment of only some of the objectives and advantages of this invention. Changes may be made to the specifically disclosed capsule receiving station in order to accommodate different capsule constructions. Any of such variations or modifications may be made while still obtaining some or all of the objectives of this invention. Therefore, it is the intent of the appended claims to cover all such variations and modifications as come within the true spirit and scope of this invention.

What is claimed as new and desired to be secured by Letters Patent of the United States is:

1. Apparatus for brewing a hot beverage by infusing a material with hot water under pressure above atmospheric pressure at an acceptable brewing temperature, said apparatus including tank structure for forming first and second tank volumes with a port network for enabling water flow between the first and second tank volumes, a brewing chamber for containing the material and having an inlet and an outlet, and a conveyor for conveying water from said first and second tank volumes to the inlet of said brewing chamber, said tank structure further including:

a selectively sealable, inlet to said tank structure and sealing structure selectively operable between first and second positions to selectively open and close the inlet to the tank structure, said inlet with the sealing structure in said first position being open to open said tank structure to the atmosphere and allow water at an input temperature below said acceptable brewing temperature to be directed at atmospheric pressure through said inlet into said first and second tank volumes of said tank structure to a respective first water level in each respective first and second tank volume via said port network for enabling water flow between said first and second tank volumes, said first water levels being respectively lower than the inlet to the tank structure, said water in each of said first and second tank volumes being at atmospheric pressure with the sealing structure in said first position opening the inlet to the tank structure, said sealing structure in said second position closing and sealing the inlet and the tank structure including the first and second tank volumes in said tank structure from the atmosphere, hydraulic communication structure between said first and second tank volumes extending above the respective first water level in each respective first and second tank volume, said port network for enabling water flow between said first and second tank volumes further enabling water flow among said first and second tank volumes and said conveyor, and a heater for boiling the water in said first tank volume when said sealing structure is in said second position closing and sealing the inlet to the tank structure and closing and sealing the tank structure including the first and second tank volumes from the atmosphere to produce steam under pressure above atmospheric pressure in said first tank volume while the water in said second tank volume remains substantially at the input temperature, said steam pressure above atmospheric pressure in said first tank volume via the hydraulic communication structure between said first and second tank volumes above said respective first water level in each respective first and second tank volume driving water from each of said first and second tank volumes via said port network into said conveyor and on to the inlet of the brewing chamber.

2. The hot beverage brewing apparatus as recited in claim 1 wherein said first tank volume is located within said second tank volume in said tank structure.

3. The hot beverage brewing apparatus as recited in claim 1 wherein said heater is electrically powered and includes:
i) a sensor for indicating the temperature of the water in said first tank volume, and
ii) a control for adjusting the power to said heater thereby to control the rate at which said heater produces steam and the delivery rate of the water into the brewing chamber containing the infusible material.

4. The hot beverage brewing apparatus as recited in claim 1 wherein the ratio of the quantity of water in said first and second tank volumes at the respective first water levels is $(PT1)+[(100-P)T2]=100T3$ where $T1$ and $T2$ are the temperatures of the water in said first and second tank volumes, respectively, where $T3$ is the acceptable brewing temperature and where $P$ is the percentage of the water contained in said first and second tank volumes to be contained in said first tank volume.

5. The hot beverage brewing apparatus as recited in claim 1 wherein said apparatus includes a housing for containing said tank structure, said heater, said conveyor, and said brewing chamber and wherein said sealing structure includes a lid attached to said housing and movable between said first and second positions to selectively open and close the inlet to the tank structure, said lid and said inlet including complementary sealing structure for sealing said inlet from the atmosphere when said lid is in the second position closing said inlet.

6. The hot beverage brewing apparatus as recited in claim 2 wherein the first tank volume is concentrically located within said second tank volume in said tank structure.

7. The hot beverage brewing apparatus as recited in claim 1 wherein the conveyor for conveying water from said first and second tank volumes to the inlet of said brewing chamber extends upwardly from the first and second tank volumes to a position higher than the inlet to the tank structure.

8. The hot beverage brewing apparatus as recited in claim 7 further including a lid movable to cover and uncover the brewing chamber wherein said lid supports at least a portion of the conveyor.

\* \* \* \* \*